United States Patent
Ito et al.

(10) Patent No.: US 6,526,950 B2
(45) Date of Patent: Mar. 4, 2003

(54) FUEL VAPOR TREATMENT SYSTEM

(75) Inventors: Masashi Ito; Mikio Kawai, both of Kanagawa; Kazuhiko Shinohara, Yokohama; Hiroshi Akama, Kanagawa; Junji Ito, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/778,758

(22) Filed: Feb. 8, 2001

(65) Prior Publication Data

US 2001/0011539 A1 Aug. 9, 2001

(30) Foreign Application Priority Data

Feb. 9, 2000 (JP) .................................. 2000-032500
Feb. 9, 2000 (JP) .................................. 2000-032501
Oct. 19, 2000 (JP) .................................. 2000-318957
Nov. 29, 2000 (JP) .................................. 2000-363626

(51) Int. Cl.[7] ............................................. F02M 33/02
(52) U.S. Cl. ...................... 123/518; 123/520; 123/541
(58) Field of Search ............................... 123/520, 519, 123/518, 516, 541, 540, 25 P, 25 D

(56) References Cited

U.S. PATENT DOCUMENTS

| | | | |
|---|---|---|---|
| 4,030,453 A | * | 6/1977 | Sugimoto .................. 123/25 B |
| 4,337,731 A | * | 7/1982 | Lohberg .................... 123/25 B |
| 4,476,817 A | * | 10/1984 | Lindberg .................... 123/3 |
| 5,207,734 A | | 5/1993 | Day et al. |
| 5,456,236 A | | 10/1995 | Wakashiro et al. |
| 5,479,904 A | | 1/1996 | Fujimori et al. |
| 5,632,252 A | | 5/1997 | Hyodo et al. |
| 5,957,113 A | * | 9/1999 | Masaki et al. .............. 123/518 |

FOREIGN PATENT DOCUMENTS

| | | |
|---|---|---|
| JP | 10-274106 | 10/1998 |
| JP | 11-93784 | 4/1999 |

* cited by examiner

Primary Examiner—Willis R. Wolfe
Assistant Examiner—Mahmoud Gimie
(74) Attorney, Agent, or Firm—Foley & Lardner

(57) ABSTRACT

A fuel vapor treatment or recovery system for an automotive internal combustion engine. The system comprises a canister containing a fuel vapor adsorbing material. A membrane separation module is provided to be connected to the canister and including a separation membrane for separating a mixture gas into an air-rich component and a fuel vapor-rich component. The separation membrane has an air-selective permeability so that the air-rich component is be able to pass through the separation membrane, the mixture gas containing air and fuel vapor. Additionally, a gas transporting device is provided to be connected to the canister, for causing purge gas to be introduced into the canister to purge fuel vapor from the fuel vapor adsorbing material and causing fuel vapor purged from the canister to be fed to the membrane separation module. Here, the fuel vapor-rich component is fed to an intake air passageway of an engine so that vacuum generated by the engine acts on the separation membrane so as to serve as a driving force for membrane separation. Further, the air-rich component from the membrane separation module is returned to the fuel tank so that fuel vapor component contained in the fuel vapor-rich component is recovered to the fuel tank upon being subjected to at least one of liquefaction and absorption to liquid fuel in the fuel tank.

42 Claims, 23 Drawing Sheets

FUEL VAPOR TREATMENT SYSTEM

BACKGROUND OF THE INVENTION

The present invention relates to improvements in a fuel vapor treatment system which effectively treats fuel vapor generated in a fuel tank, more specifically to a fuel vapor treatment system and exhaust gas purification system which purges and reforms the adsorbed fuel vapor, using water vapor, and uses the generated reformed gas containing hydrogen and carbon monoxide for the combustion or purification of exhaust gas in an internal combustion engine. It also relates to a fuel vapor treatment system and exhaust gas purification system which reforms the property of the adsorbed fuel vapor and purges generated hydrogen-rich gas before using it for the purification of exhaust gas in said internal combustion engine. Additionally, the present invention also more particularly relates to a fuel vapor recovery system by which fuel vapor generated in the fuel tank is recovered to the fuel tank.

Hitherto, a fuel vapor treatment (recovery) system has come into practical use for the purpose of preventing fuel vapor generated in a fuel tank of a vehicle from dispersing into the atmosphere. In this fuel vapor recovery system, fuel vapor, generated by a rise in the temperature of fuel in a fuel tank, for instance, is adsorbed and stored temporarily by activated carbon in a canister through a path and a fuel vapor inflow port. Then it goes through a path, having a control valve, into an induction pipe or intake air passageway by use of the negative pressure of the induction pipe of the engine so that the amount of stored fuel vapor may not exceed the adsorption capacity of the canister.

Desorption of fuel vapor from the canister will be more specifically discussed. Fuel vapor adsorbed and stored by activated carbon in the canister goes through fuel vapor exhaust port and is purged by air that is led into the canister through a gas inflow port connected to the bottom of the canister. The quantity of fuel vapor flowing into the induction pipe is controlled by a purge control valve and is burned in a combustion chamber of the engine.

SUMMARY OF THE INVENTION

However, although the fuel vapor recovery system controls the quantity of fuel vapor flowing from the path into the induction pipe, it controls gas mixed with fuel vapor that is not accurately measured and with air. Accordingly, addition of this mixed air to the accurately measured component of the combustion, which is emitted from a fuel injection valve placed upstream of the induction pipe, makes combustion difficult at the already set air-fuel ratio and causes problems, such as deterioration of driving performance of the engine and produces bad effects on the components of exhaust gas.

Also, it has been required to cut down on fuel consumption in order to deal with recent environmental problems and promote resource-saving trends. The above problems will be more apparent, if combustion at the ultra-lean air-fuel ratio (approximately 40 to 50) of air-fuel mixture to be supplied to the engine is carried out by direct fuel injection to a combustion chamber rather than the combustion at the lean air-fuel ratio (approximately 20) in the past.

On the other hand, with the improvement of combustion efficiency of the internal combustion engines, the exhaust gas temperature has been lowered and amelioration of purification efficiency of NOx at the exhaust temperature, lower than 250° C., has been sought. An exhaust gas purification system has been demanded that can keep high efficiency in the reduction and purification of NOx under such lower exhaust gas temperature conditions.

It is an object of the present invention to provide an improved fuel vapor treatment system which can effectively overcome drawbacks encountered in conventional fuel vapor treatment systems.

Another object of the present invention is to provide an improved fuel vapor treatment system or exhaust gas purification system which can realize improvements in fuel economy (fuel consumption) and high NOx reduction efficiency under low temperature conditions, without affecting preset air-fuel ratio of air-fuel mixture to be supplied to an engine and without affecting operational characteristics of the engine and composition of exhaust gas discharged from the engine.

A further object of the present invention is to provide an improved fuel vapor treatment system which uses a membrane separation module, which does not require a vacuum pump for driving the membrane separation module and can effectively prevent fuel vapor from being emitted to the atmosphere even in case a large amount of fuel vapor is generated, without effecting operational characteristics of an engine and the composition of exhaust gas discharged from the engine even though a component passed through a separation membrane is introduced into the intake air passageway of the engine.

A first aspect of the present invention resides in a fuel vapor treatment system comprising a canister containing a fuel vapor adsorbing material and having a portion defining an inflow port through which fuel vapor from a fuel tank for an engine is flown to the fuel vapor adsorbing material, a portion defining a gas introduction port though which a purge gas for purging fuel vapor adsorbed in the fuel vapor adsorbing material is introduced into the canister, and a portion defining an outflow port through which fuel vapor purged from the fuel vapor adsorbing material is flown out of the canister. A fuel vapor treating device is provided for treating fuel vapor flown out of the canister through the outflow port so as to form a gas whose major part is other than fuel vapor. Additionally, a gas supplying or transporting device is provided to be connected to the canister, for supplying the purge gas into the canister to purge fuel vapor from the fuel vapor adsorbing material and causing the purged fuel vapor to be fed to the fuel vapor treating device. Here, the gas formed in the fuel vapor treating device is introduced into at least one of an intake air passageway and an exhaust gas passageway of the engine so as to be combusted in the engine.

A second aspect of the present invention resides in a fuel vapor recovery system comprising a canister containing a fuel vapor adsorbing material and having a portion defining an inflow port through which fuel vapor from a fuel tank of an engine is flown to the fuel vapor adsorbing material, a portion defining a gas introduction port though which a gas for purging fuel vapor adsorbed in the fuel vapor adsorbing material is introduced into the canister, and a portion defining an outflow port through which fuel vapor purged from the fuel vapor adsorbing material is flown out of the canister. A membrane separation module is provided to be connected to the canister and including a separation membrane for separating a mixture gas into an air-rich component and a fuel vapor-rich component. The separation membrane has an air-selective permeability so that the air-rich component is be able to pass through the separation membrane, the mixture gas containing air and fuel vapor. The membrane separation module has a portion defining an air-rich component discharge port through which the air-rich component is discharged out of the membrane separation module, and a portion defining a fuel-rich component discharge port through which the fuel-rich component is discharged out of the membrane separation module. Additionally, a gas transporting device is provided to be connected to the canister, for causing the purge gas to be introduced into the canister to purge fuel vapor from the fuel vapor adsorbing material and causing the purged fuel vapor to be fed to the membrane separation module. Here, the fuel vapor-rich component discharge port of the membrane separation module is connected to an intake air passageway of an engine so that vacuum generated by the engine acts on the separation membrane so as to serve as a driving force for membrane separation. Further, the air-rich component discharge port of the membrane separation module is connected to the fuel tank so that fuel vapor component contained in the fuel vapor-rich component is recovered to the fuel tank upon being subjected to at least one of liquefaction and absorption to liquid fuel in the fuel tank.

A third aspect of the present invention resides in a fuel vapor treatment system comprising a canister containing a fuel vapor adsorbing material and having a portion defining an inflow port through which fuel vapor from a fuel tank for an engine is flown to the fuel vapor adsorbing material, a portion defining a gas introduction port though which a purge gas containing steam is introduced into the canister so as to purge fuel vapor adsorbed in the fuel vapor adsorbing material, and a portion defining an outflow port through which fuel vapor purged from the fuel vapor adsorbing material and steam are flown out of the canister. A gas supplying device is provided for supplying the purge gas into the canister. Additionally, a reforming device is provided for carrying out steam reforming for fuel vapor discharged through the outflow port of the canister to form reformed gas containing hydrogen and carbon monoxide. Here, the reformed gas is introduced into an intake air passageway of the engine so as to be combusted in the engine.

A fourth aspect of the present invention resides in a fuel vapor treatment system comprising a canister containing a fuel vapor adsorbing material and including a hydrogen-enriching device for reforming fuel vapor adsorbed in the fuel vapor adsorbing material so as to form a hydrogen-rich gas, the canister having a portion defining an inflow port through which fuel vapor from a fuel tank of an engine is flown to the fuel vapor adsorbing material, a portion definin gagas introduction port though which a purge gas is introduced into the canister so as to purge fuel vapor the hydrogen-rich gas in the canister, and a portion defining an outflow port through which the purged hydrogen-rich gas is flown out of the canister. Additionally, a gas transporting device is provided for supplying the purge gas into the canister. Here, the purged hydrogen-rich gas is introduced into an exhaust gas passageway of the engine so as to purify exhaust gas of the engine.

A fifth aspect of the present invention resides in a exhaust gas purification system for an internal combustion engine, comprising a catalyst for purifying exhaust gas of the internal combustion engine. Additionally, an fuel vapor treatment system is provided including a canister containing a fuel vapor adsorbing material and having a portion defining an inflow port through which fuel vapor from a fuel tank for the engine is flown to the fuel vapor adsorbing material, a portion defining a gas introduction port though which a purge gas containing steam is introduced into the canister so as to purge fuel vapor adsorbed in the fuel vapor adsorbing material, and a portion defining an outflow port through which fuel vapor purged from the fuel vapor adsorbing material and steam are flown out of the canister. A gas supplying device is provided for supplying the purge gas into the canister. A reforming device is provided for carrying out steam reforming for fuel vapor discharged through the outflow port of the canister to form reformed gas containing hydrogen and carbon monoxide. Here, the reformed gas is introduced to the exhaust gas purifying catalyst to reduce nitrogen oxides in exhaust gas of the engine.

A sixth aspect of the present invention resides in an exhaust gas purification system for an internal combustion engine, comprising a catalyst for reducing NOx in exhaust gas of the internal combustion engine. A fuel vapor treatment system is provided including a canister containing a fuel vapor adsorbing material and including a hydrogen-enriching device for reforming fuel vapor adsorbed in the fuel vapor adsorbing material so as to form a hydrogen-rich gas, the canister having a portion defining an inflow port through which fuel vapor from a fuel tank of the engine is flown to the fuel vapor adsorbing material, a portion defining a gas introduction port though which a purge gas is introduced into the canister so as to purge fuel vapor the hydrogen-rich gas in the canister, and a portion defining an outflow port through which the purged hydrogen-rich gas is flown out of the canister. A gas transporting device is provided for supplying, the purge gas into the canister. Here, the purged hydrogen-rich gas from the hydrogen-enriching device is supplied to the NOx reducing catalyst so as to reduce nitrogen oxides and removing sulfur compound in exhaust gas of the engine.

BRIEF DESCRIPTION OF THE DRAWINGS

In the drawings, like reference numerals designate like elements and parts throughout all figures, in which.

DETAILED DESCRIPTION OF THE INVENTION

Figure 1:
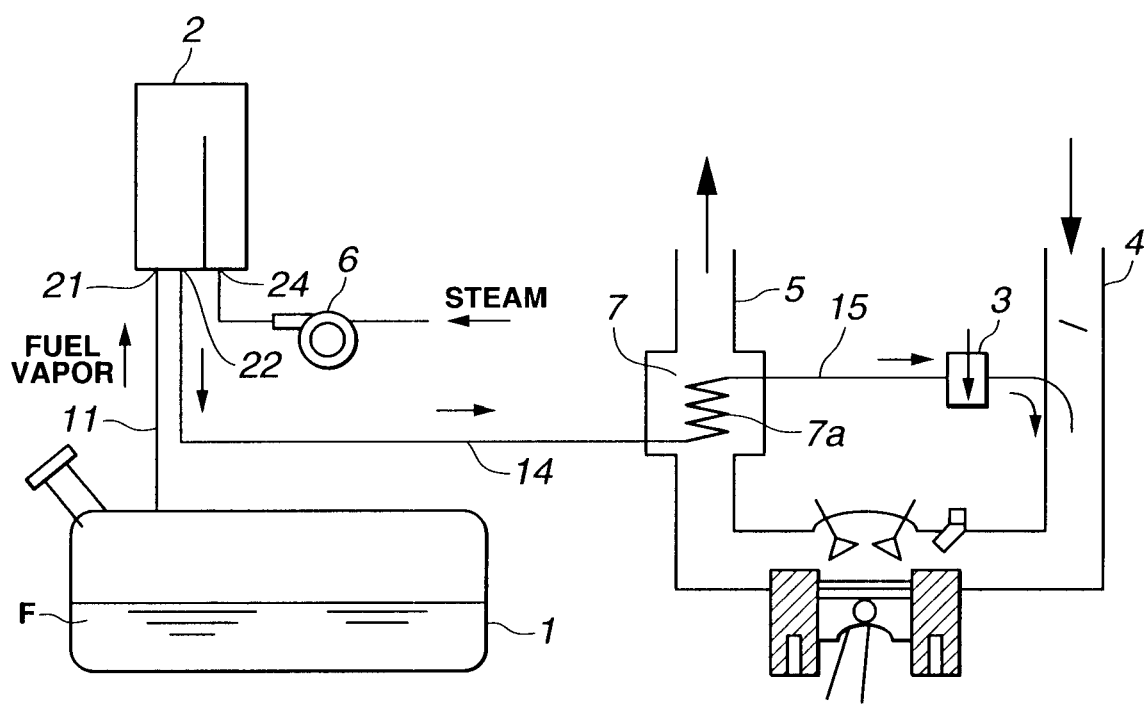
FIG. 1 is a cross-sectional view of an example of a fuel vapor treatment system of the present invention.

Referring now to FIGS. 1 to 10, embodiments of a fuel vapor treatment system according to an aspect of the present invention will be discussed.

The fuel vapor treatment system of this aspect comprises a canister containing a fuel vapor adsorbing material and having a portion defining an inflow port through which fuel vapor from a fuel tank for an engine is flown to the fuel vapor adsorbing material, a portion defining a gas introduction port though which a purge gas containing steam is introduced into the canister so as to purge fuel vapor adsorbed in the fuel vapor adsorbing material, and a portion defining an outflow port through which fuel vapor purged from the fuel vapor adsorbing material and steam are flown out of the canister. A gas supplying device is provided for supplying the purge gas into the canister. Additionally, a reforming device is provided for carrying out steam reforming for fuel vapor discharged through the outflow port of the canister to form reformed gas containing hydrogen and carbon monoxide. Here, the reformed gas is introduced into an intake air passageway of the engine so as to be combusted in the engine. The engine in this instance is an internal combustion engine of an automotive vehicle.

In the fuel vapor treatment system of the present invention, having the above arrangement, fuel vapor in the fuel tank flows into the canister once and is adsorbed by an adsorbent or fuel vapor adsorbing material in the canister. Fuel vapor is desorbed by purge gas containing moisture vapor (water vapor or steam) sent in through the gas inflow port of the canister.

Here, moisture vapor is used for subsequent reforming with moisture vapor, and purging with moisture vapor has benefits since it has better substitution efficiency than purging by pressure reduction or bringing in air and desorbing is possible with a small quantity of moisture vapor in a short time.

Further, the installation of a water tank and a moisture vapor generation unit or device for generating stream can supply moist vapor, but it is also possible to use exhaust gas emitted from an internal combustion engine which is to be improved. If exhaust gas is used as a source of steam, additional devices such as a water tank or a moisture vapor generation unit are not needed and the composition of the unit is simplified and so costs can be cut down.

Desorbed or purged gas is expected to contain fuel vapor and moisture vapor. In the present invention this desorbed gas is not directly sent into the induction pipe of the engine, but to a reformer or reforming device to reform its property with moisture vapor and generate reformed gas mainly containing hydrogen and carbon monoxide. Then this reformed gas is sent into an induction pipe or intake air passageway of the engine for combustion and fuel vapor is effectively used.

If hydrocarbons vapor (fuel vapor) is brought into the induction pipe of the engine without being reformed, the problems described above will happen. Since combustion at the set air-fuel ratio is difficult, driving performance of the engines will deteriorate and unburned hydrocarbons gas is mixed into exhaust gas. Such problems will be more apparent if combustion at the ultra-lean air-fuel ratio of air-fuel mixture is to be conducted. In addition, when fuel vapor in the canister almost reaches a point of saturation due to long term parking and when the occurrence of fuel vapor is great due to a traffic jam and it becomes necessary to purge fuel vapor at any cost, the ultra-lean burn has to be returned to homogenous burn (or homogeneous charge combustion) before purging is performed. As a result, fuel consumption was sometimes influenced.

As opposed to the above, the present invention uses gas containing hydrogen and carbon monoxide and reformed by the use of moisture vapor and accordingly it does not cause the above-mentioned problems. It is because hydrogen gas and carbon monoxide gas have high knocking resistance and allow ultra-lean burn that they keep stability under the conditions of excessive air with a high compression ratio up to 14 to 16 or an air-fuel (air/fuel) ratio ranging of from 40 to 50 of air-fuel mixture. Therefore, purging at the time of ultra-lean burn was unable to be realized with hydrocarbons vapor, but could be realized with the reformed gas.

Another benefit of the present invention is facilitation of reforming by the use of waste heat of the engines since the component of fuel vapor adsorbed by the canister contains a good deal of a light component of paraffin, having C4 to C6, and can be reformed sufficiently at relatively low temperatures of 300° C. to 350° C., which are lower than 350° C. required for direct reforming with gasoline.

The present invention provides the above-mentioned reformed gas into the induction pipe of the engine and supplies it to placed catalyst for purifying exhaust gas. Therefore, it can promote purification of nitrogen oxide by using hydrogen and carbon monoxide contained in the reformed gas as a reducing agent and it can particularly effectively purify nitrogen oxide generated at the time of lean burn and ultra-lean burn.

Next, another fuel vapor treatment system of the present invention will be discussed.

In such fuel vapor treatment system, fuel vapor generated in the fuel tank is sent through the gas inflow port in the canister and adsorbed by the adsorbent in the canister. Before the amount of the fuel vapor adsorbed by the adsorbent reaches a point of saturation, reforming is carried out and hydrogen-rich gas (reformed gas having a high hydrogen concentration) is generated. This hydrogen-rich gas is purged by carrier gas or purged gas, for example, containing air and exhaust gas, and is sent into the exhaust pipe of the internal combustion engine. As a result, the above-mentioned hydrogen-rich gas can be used for the purification treatment of exhaust gas.

The exhaust gas purification system of the present invention uses the above-mentioned fuel vapor treatment system and supplies the above-mentioned hydrogen-rich gas to the catalyst for the purification of NOx, placed at the exhaust pipe or exhaust gas passageway of the internal combustion engine. Therefore, a reduction of nitrogen oxide and/or removing of sulfur compounds are facilitated.

Here, as the condition for reforming is such that hydrogen starts to be generated at a reaction temperature higher than 260° C. Particularly, in the case where high efficiency of purifying NOx is required at relatively low temperatures of exhaust gas (lower than 250° C.), it is effective to control the above-mentioned condition for reforming within a temperature range between 350° C. to 380° C. In other words, those who have invented the present invention have found that if rhodium(Rh)/alumina catalysts are used within the above temperature range, generation of a by-product, CO, can be restricted together with a high hydrogen yield and further by supplying the hydrogen-rich gas containing a very small amount of CO to the catalysts for purifying NOx, high efficiency for purifying NOx at the temperature of exhaust gas lower than 250° C. could be achieved. What caused the above has not be clarified, but it is assumed at the moment that CO is adsorbed by the catalysts for purifying NOx and its purification reaction is prohibited at a temperature of exhaust gas, which is lower than 250° C.

Also, in the case where even a very small amount of sulfur is contained in exhaust gas, the catalysts for purifying NOx get poisoned and catalytic performance gradually deteriorates. To recover from such deteriorated catalytic performance, it is required to remove the sulfur content (sulfur compounds) adsorbed by the surface of the catalysts at a high temperature. In the past for the purpose of desorbing, the temperature of exhaust gas flowing through the catalysts for purification of NOx needed to be kept 650° C. at the lowest.

The exhaust gas purification system of the present invention made it possible to perform the above-mentioned removing of sulfur even in a temperature range of 500° C. to 600° C., by making a concentration of co-existing hydrogen in such exhaust gas relatively high. In other words, if the temperature of exhaust gas is higher than 500° C., hydrogen-rich gas can be supplied to the catalyst for purifying NOx and the good performance of the catalyst for purifying NOx can be kept for a long time.

Specifically, it has become possible to supply a relatively high concentration (a few percent) of hydrogen-rich gas from a pipe other than the exhaust pipe to the inlet of the catalyst for purifying NOx, and to make the catalyst free from sulfur poisoning at a temperature of exhaust gas lower than the temperature needed in the past by more than 100° C.

Moreover, since the component of fuel vapor retained in the adsorbent (adsorbing means) of this fuel vapor treatment system can be efficiently reformed into hydrogen at a temperature higher than 300° C., the unit has benefits of a high purge rate and high adsorption performance of fuel vapor can be kept all the time.

An embodiment of the fuel vapor treatment system will be discussed with reference to FIG. 1.

FIG. 1 is a cross-sectional view, showing an example of a fuel vapor treatment system of the present invention. As shown in the drawing, this fuel vapor treatment system comprises a canister 2 connected to a fuel tank 1 (containing fuel F) of the engine, a steam blower 6, which is an example of the gas supplying device or means of supplying the canister 2 with purge gas that contains moisture vapor, and a reformer or reforming device 7, which reforms the purged gas flowing from the canister 2 with moisture vapor and is connected to an induction pipe or intake air passageway 4 of the engine through a purge control valve 3.

In the system the canister 2 is sufficient if it can adsorb and retain fuel vapor, and various kinds of containers can be used as the canister. As for the fuel vapor adsorbing material (adsorbents) of fuel vapor, substance such as activated carbon can be used.

The means of supplying purge gas, either composed of moisture vapor or containing moisture vapor, is not limited, either and a combination of the steam blower, a water tank and a heater, as shown in the drawing, or another combination can be used as an example. Moreover, as described above, exhaust gas of the engine can be used as purge gas and in that case an exhaust pipe functions as a means of supplying purge gas.

The reformer 7 is sufficient if it can perform the below-mentioned reaction for reforming the gas with moisture vapor, and various kinds of reaction containers can be used.

Next, another embodiment of the fuel vapor treatment system according to the present invention will be discussed.

The fuel vapor treatment system of this embodiment comprises a canister containing a fuel vapor adsorbing material and including a hydrogen-enriching device for reforming fuel vapor adsorbed in the fuel vapor adsorbing material so as to form a hydrogen-rich gas, the canister having a portion defining an inflow port through which fuel vapor from a fuel tank of an engine is flown to the fuel vapor adsorbing material, a portion defining a gas introduction port though which a purge gas is introduced into the canister so as to purge fuel vapor the hydrogen-rich gas in the canister, and a portion defining an outflow port through which the purged hydrogen-rich gas is flown out of the canister. Additionally, a gas transporting device is provided for supplying the purge gas into the canister. Here, the purged hydrogen-rich gas is introduced into an exhaust gas passageway of the engine so as to purify exhaust gas of the engine.

Figure 10:
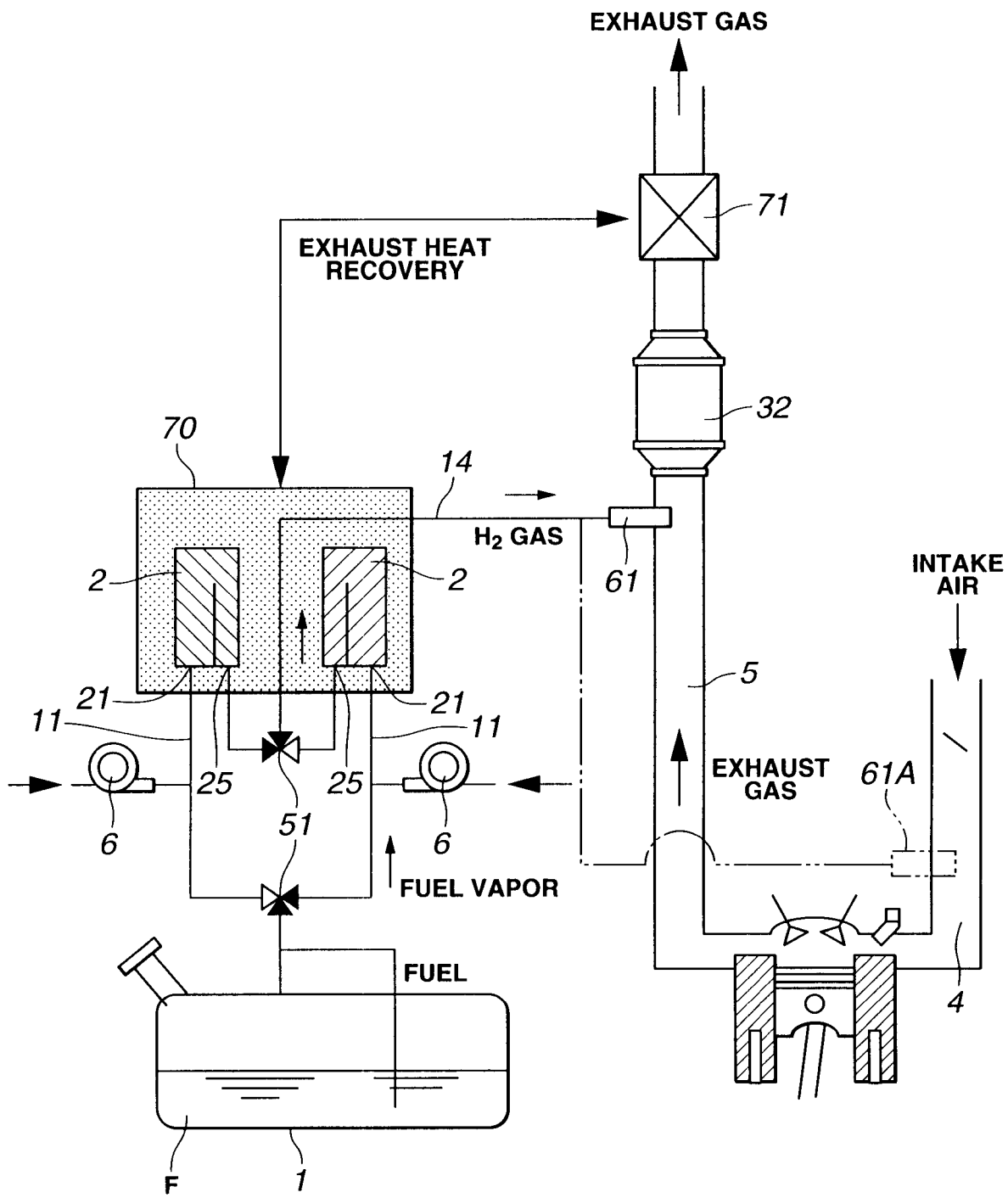
FIG. 10 is a cross-sectional view of a further example of the fuel vapor treatment system of the present invention.

This fuel vapor treatment system has a composition similar to the above-mentioned fuel vapor treatment system, except that it has a function of reforming fuel vapor in the canister. FIG. 10 is a cross-sectional view showing an example of this fuel vapor treatment system. As is shown in the drawing, this fuel vapor treatment system comprises the canister 2 connected to the fuel tank 1 of the engine and the steam blower 6, which is an example of means of supplying carrier gas (purge gas) to the canister 2. The canister 2 is connected to the fuel tank 1 and the blower 6 through the fuel vapor inflow port 21 so that the canister can lead fuel vapor and purge gas. It is also connected to the exhaust pipe 5 through an exhaust port 25 for hydrogen-rich gas, a three-way valve 51, and an injector 61 so that the canister can supply purged hydrogen-rich gas upstream of the catalyst 32 for purifying NOx. Further, the fuel vapor inflow port 21 also functions as a purge gas inflow port.

Also, the two canisters 2 that the above-mentioned fuel vapor treatment system has are installed in an adsorber and reformer 70 and this adsorber and reformer 70 is connected to a heat exchanger 71, which is an example of a heating mechanism set on the exhaust pipe 5.

Here, the canister 2 comprises a fuel vapor adsorbent (hereinafter abbreviated as the "adsorbent"), an example of a means of adsorbing fuel vapor, and a fuel reforming catalyst, and an example of a means of enriching hydrogen (hereinafter abbreviated "reforming catalyst(s)"). In other words, in terms of function, the conventional canister is integrated with a reforming micro-reactor, and it is made up of, for instance, an adsorbent having high heat resistance and catalysts that can promote a reforming reaction. In addition, since the fuel vapor treatment system shown in FIG. 11 comprises two of such canisters, it can adsorb and reform fuel vapor almost at the same time. However, the two functions need not always be performed almost at the same time, and when the engine is stopped, such as at the time of parking, only the above-mentioned means of adsorbing fuel vapor can be made function.

For the above-mentioned adsorbent or fuel vapor absorbing material, an inorganic porous substance containing silicon oxide and/or aluminium oxide can be used. Crystalline aluminosilicate referred to as zeolite and silica having mesoscopic pores with large superficial areas can be used as examples of the inorganic porous substance. MFI zeolite whose silica/alumina mole ratio is about 85 is preferable as the adsorbent. The substance can adsorb volatile hydrocarbons in the fuel due to its high point of saturation and can guarantee heat resistance of approximately 600° C. at the lowest.

Also, below-mentioned reforming catalysts (such as Rh/alumina catalysts) can be incorporated into the above-mentioned inorganic porous substance (such as MFI zeolite), preferably to construct double layered catalysts or two-stage type catalysts. The double layered catalysts are formed in the following manner: A cordierite ceramic honeycomb-type substrate having 600 cells per square inch is coated with a mixture of MFI zeolite and silica binder first, and then coated with Rh/alumina catalysts. The two-stage type catalysts are constructed by placing such zeolite in the front stage and placing Rh/alumina catalysts in the rear stage. Further, these adsorbents can be combined and used with activated carbon as well.

For the above-mentioned reforming catalysts, it is preferable to use catalysts containing rhodium (Rh) as an active component and they include Rh/alumina catalysts, Rh/silica, Rh/zirconia and Rh/ceria.

Also, to use hydrogen-rich gas efficiently for purifying NOx, it is desirable for a heating mechanism to keep such reforming catalysts in a temperature range between 260° C. and 380° C. As a heating mechanism, for instance, a heat exchanger 71 that takes advantage of heat of exhaust gas from the internal combustion engine and an electrical heater can be applied and from the standpoint of energy conservation it is desirable to use the heat of exhaust gas.

It is possible to supply obtained hydrogen-rich gas directly to the exhaust pipe 5 or the inlet of catalyst for purifying NOx, but it is also effective to install a means of storage (such as a tank storing hydrogen-rich gas and solid metal hydride) for the purpose of injecting the needed amount of hydrogen in response to the exhaust gas condition at an appropriate time. In addition, if provision of hydrogen is further needed, fuel can be directly supplied to the adsorber and reformer 70.

Additionally, as a means of supplying purge gas, a gas injecting system such as the blower 6 (such as a steam blower) can typically be adopted, but the means is not limited to it and a combination such as of a water tank and a heater can be used. Also, exhaust gas from the internal combustion engine can typically be used as gas for purging the hydrogen-rich gas, but exhaust gas is not the only example.

By adopting an arrangement of supplying the above-mentioned hydrogen-rich gas to the catalyst for purifying NOx, installed in the internal combustion engine, the above-mentioned fuel vapor treatment system can be adopted as an exhaust gas purification system.

Specifically, the exhaust gas purification system of the present invention supplies hydrogen-rich gas obtained by means of enriching hydrogen in the above-mentioned fuel vapor treatment system to the above-mentioned catalyst for purifying NOx. By providing the hydrogen-rich gas, a reduction of nitrogen oxide and/or removing of sulfur compounds are promoted and accordingly exhaust gas from the internal combustion engine is efficiently purified.

It is desirable for such an exhaust gas purification system to synchronize the supply of the above-mentioned hydrogen-rich gas to the above-mentioned catalyst for purifying NOx with fluctuations of the concentration of oxygen in the exhaust gas. If it is achieved, the needed amount of the hydrogen-rich gas can be supplied to the catalyst for purifying NOx precisely within a limited period of time and NOx can be effectively purified. For instance, it is possible to install an injector 61, which allows the above-mentioned hydrogen-rich gas to be injected and supplied to the inlet of the catalyst for purifying NOx when the lean condition is changed to the rich conditions or stoichiometric condition, in the exhaust gas purification system set in an automobile. It is desirable for such injector 61 to excel in response.

Also, if the temperature of exhaust gas, which goes through the exhaust pipe, is 250° C. or lower, it is preferable to supply the hydrogen-rich gas to the catalyst for purifying NOx and as a result, NOx can be purified efficiently at the low temperature of exhaust gas. In this case, it is desirable to keep the reforming catalyst in a temperature range between 350° C. and 380° C. and that can prevent generation of a by-product, CO. In addition, it is desirable to supply the hydrogen-rich gas under the stoichiometric condition with a low oxygen concentration or the rich conditions.

In addition, if the temperature of exhaust gas, which goes through the exhaust pipe, is higher than 500° C., it is preferable to supply the hydrogen-rich gas to the catalyst for purifying NOx and as a result, the performance of the catalyst for purifying NOx can be maintained for a long time. In this case, it is desirable to keep the reforming catalyst between 350° C. and 500° C. and by doing so, a high hydrogen yield can be achieved.

EXAMPLES

The present invention of the above aspect will be more readily understood with reference to the following Examples in comparison with Comparative Examples; however, these Examples are intended to illustrate the invention and are not to be construed to limit the scope of the invention.

Example 1-1

Figure 2:
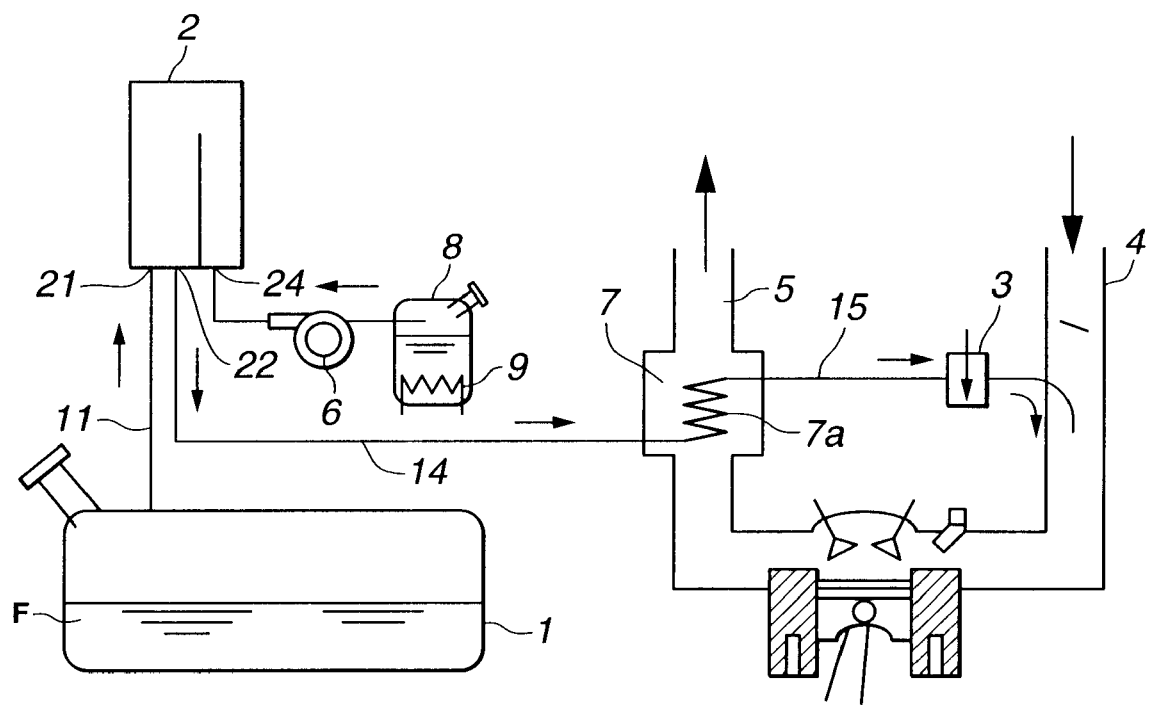
FIG. 2 is a cross-sectional view of another example of the fuel vapor treatment system of the present invention.

FIG. 2 is a cross-sectional view, which shows an example of the fuel vapor treatment system of the present invention. The system of the example comprises a water tank 8 and a moisture vapor generator (heater) 9 as means of supplying purge gas, as illustrated in the drawing. First, the state of connection among components in FIG. 2 will be described.

The canister 2 comprises the fuel vapor inflow port 21 connected to a path 11 that leads fuel vapor from the fuel tank 1 in the canister, a moisture vapor inflow port 24 that leads moisture vapor (steam) that purges fuel vapor adsorbed by activated carbon that is a means of adsorbing the inflow of fuel vapor, and the gas exhaust outflow port 22 that exhausts desorbed gas purged from the canister.

The moisture vapor inflow port 24 of the canister is connected to the blower 6, which enables moisture vapor generated by the moisture vapor generator 9 to flow through the moisture vapor inflow port 24.

Also, a reformer or reforming device 7 is placed on the exhaust pipe 5 of the engine to assure a certain reforming temperature and with moisture vapor it reforms fuel vapor (desorbed gas) containing moisture vapor flowing in by way of a path 14 from the gas exhaust port 22 of the canister. It is connected to the induction pipe 4 of the engine by way of a path 15 after reformed gas rich in hydrogen and carbon monoxide is generated.

Here, catalysts that can be used for the reformer 7 include nickel (Ni), cobalt (Co) and rhodium (Rh).

Since the most efficient temperature range for reforming the light components of paraffin accumulated in the canister 2 falls between 300° C. and 500° C., it is desirable to place the reformer 7 on the exhaust 5 where the above-mentioned temperature range can be achieved.

In addition, in this example, the reformer 7 is formed with a coil-shaped inner core 7a in the exhaust pipe 5 so that it can assure sufficient heat to start a reforming reaction and the inner core 7a is filled with the reforming catalyst in pellet form.

A reforming reaction with moisture vapor in the reformer 7 can be represented by the following equation Eq. 1 or 2, where HC represents hydrocarbons.

$$HC + H_2O \rightarrow H_2 + CO \qquad \text{Eq. 1}$$

$$HC + H_2O \rightarrow H_2 + CH_4 + CO \qquad \text{Eq. 2}$$

Further, a purge control valve 3 is placed on a path 15 and it controls negative pressure generated in intake stroke of the engine and purge quantity.

Figure 3:
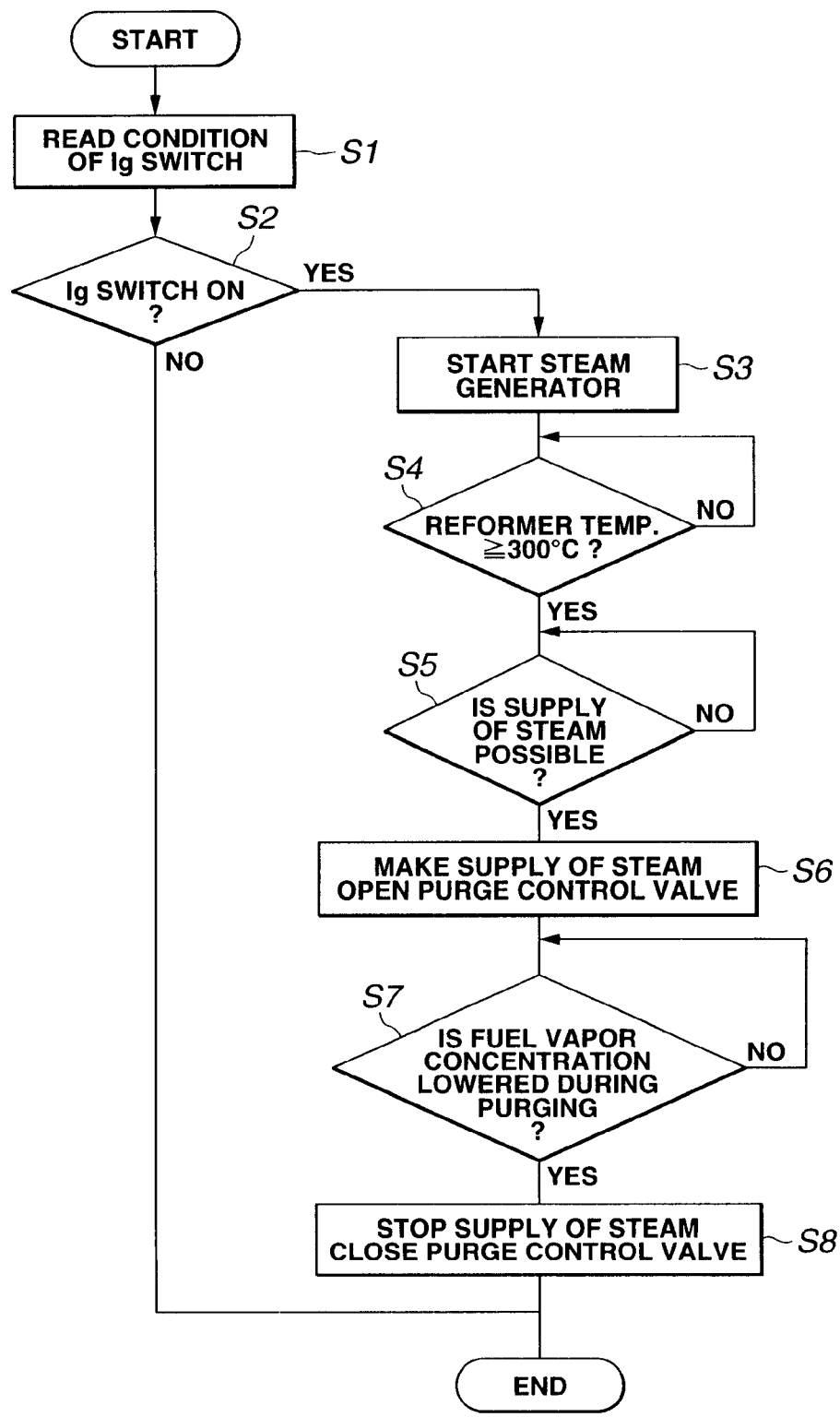
FIG. 3 is a flow chart showing a controlling example of the fuel vapor treatment system shown in FIG. 2.

The action of the fuel vapor treatment system having the above-mentioned arrangement will be discussed with reference to a flow chart illustrated in FIG. 3.

First, as for generation of fuel vapor, fuel vapor is chiefly generated when the temperature inside the fuel tank 1 rises or at the time of fueling.

Fuel vapor generated inside the fuel tank 1 is led to the canister 2 by way of the path 11 and adsorbed by activated carbon. If the ignition or key switch of the engine is turned off at the time of fueling or parking, this phenomenon alone is observed.

Next, a description is given as to a method of treating fuel vapor adsorbed by the canister as the engine starts.

First, the condition of an ignition switch (Ig) is read (See step S1) and when the engine is started (the ignition (Ig) switch is turned on) (See step S2), the moisture vapor (steam) generator 9 is started immediately (See step S3). Next, the temperature of the reformer 7 is monitored and it is determined whether the temperature of the reformer is higher than 300° C. or not (See step S4). In this example, the possibility of reforming with moisture vapor is based on whether or not the temperature of the reformer 7 is higher than 300° C. If the temperature of the reformer is higher than 300° C., whether moisture vapor generated in the moisture vapor generator 9 is sufficient for purging or not (See step S5) is checked.

When the moisture vapor generator 9 generates sufficient moisture vapor, the blower 6 sends it into the canister 2 through the moisture vapor inflow port 24 (See step S6). This step starts desorbing of the fuel vapor adsorbed by the adsorbent inside the canister and the obtained desorbed gas is sent into the reformer 7 by way of the path 14 through the gas exhaust port 22. In a transit period, the component of the reformed gas coming out of the reformer 7 varies, but when the component is stabilized, the reformed gas contains about 70% of $H_2$ and about 30% of CO in terms of a mole ratio. Further, if a reforming reaction contains methane, the mole ratio of $H_2$ and CO varies accordingly.

Generated reformed gas is sent into the induction pipe 4 of the engine through the purge control valve 3 to be burned and released into the atmosphere through the exhaust pipe 5.

When the amount of the fuel vapor adsorbed by the adsorbent inside the canister decreases on account of continued purging, the concentration of the fuel vapor in the path 14 is lowered (See step S7). In this case, it is judged that the purge in the canister 2 is completed and the inflow of moisture vapor is stopped (See step S8).

Also, after the purge in the canister 2 is completed, it is desirable to add a sequence of controls that starts the moisture vapor generator 9, sends moisture vapor in the canister 2 and checks the quantity of the adsorbed moisture vapor inside the canister at certain intervals. If the amount of the adsorbed moisture vapor is judged to have increased, the above sequence of the operation can be repeated.

Further, if a great deal of vapor is generated while driving of the vehicle, the vapor is sent into the reformer 7 together with purge gas, without being adsorbed by the canister 2. In this case, it is desirable to increase the inflow amount of moisture vapor in accordance with the amount of the generated vapor. Also, according to need, moisture vapor can be bypassed to the reformer 7 without going through the canister 2.

Water can be provided to the water tank 8 from time to time. However, to make the system maintenance-free, it is possible to build in a mechanism that condenses and collects moisture vapor from the exhaust gas or to build in a mechanism that replenishes the water tank with rain water according to need.

As described above, it was impossible to purge hydrocarbons vapor at the time of ultra-lean burn, but if it is reformed into the reformed gas chiefly composed of $H_2$ and CO as in this example, it becomes possible to purge it at the time of ultra-lean burn. Since $H_2$ and CO particularly have excellent knock resistance and ultra-lean burn is possible, they are stable even in excessive air conditions whose high compression ratio ranges from 14 to 16 and mixture ratio ranges from 40 to 50. Accordingly, it is possible to purge them in the event of homogenous charge combustion that requires torque, lean burn, and stratified charge combustion in a direct-injection engine. Therefore, purging can be performed under any kind of driving conditions of the engine and in addition, the invention makes it unnecessary to return the burn into homogenous burn for purging and mileage also improves.

If fuel vapor is directly purged, HC (hydrocarbons) could be released into the atmosphere without being burned, but $H_2$ and Co burn easily and are not released into the atmosphere. Besides, they help reduction of nitrogen oxide (NOx), which causes a problem at the time of ultra-lean burn.

In other words, if this composition where the gas reformed above is supplied to the catalyst for purifying exhaust gas, which are placed in the engine, is adopted, the fuel vapor treatment system of this example can suitably function as a exhaust gas purification system, particularly, a purification system for NOx in the gas emitted at the time of lean or ultra-lean burn.

Example 1-2

Figure 4:
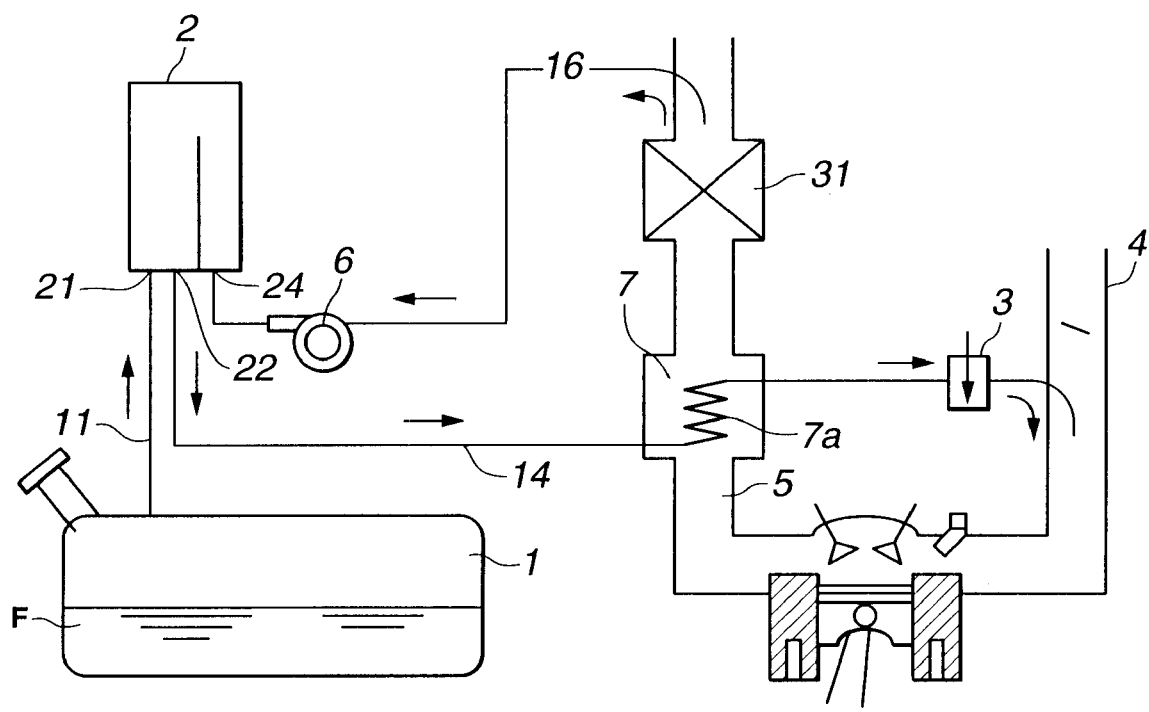
FIG. 4 is a cross-sectional view of a further example of the fuel vapor treatment system of the present invention.

FIG. 4 illustrates another example of the fuel vapor treatment system of the present invention, similar to the example 1-1.

The system of this example shows an example of treating fuel vapor, using moisture vapor contained in the exhaust gas emitted from the internal combustion engine.

The structure of the canister 2, the reformer 7, and the purge control valve 3 is the same as the example 1-1, but in this example, the moisture vapor inflow port 24 is connected to the path 16 to lead a part of the gas exhausted by the engine. It is desirable to exhaust gas found downstream of the catalyst for purifying exhaust gas 31, since it is as purified as possible and to the extent that it can be released into the atmosphere.

Figure 5:
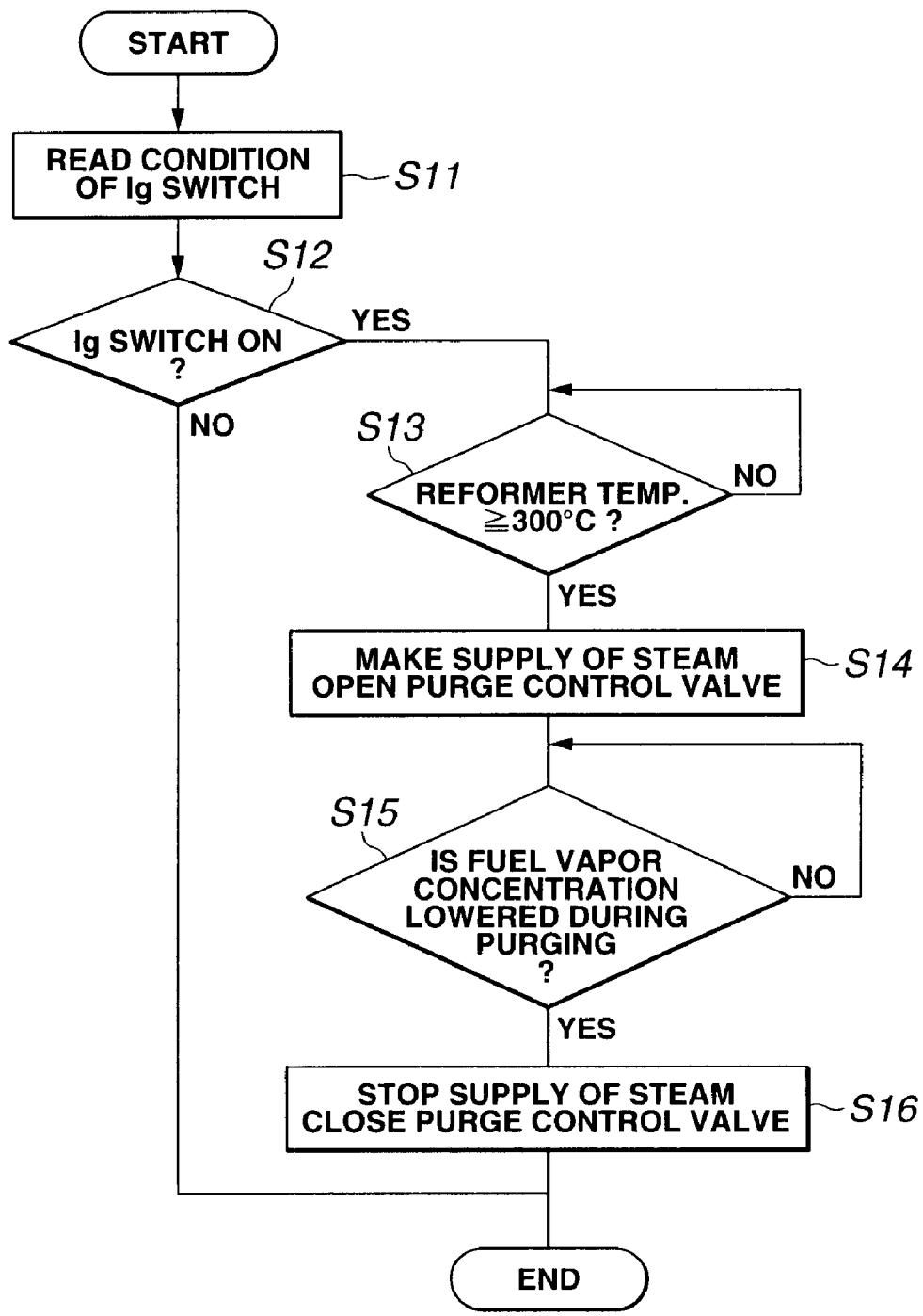
FIG. 5 is a flow chart showing a controlling example of the fuel vapor treatment system shown in FIG. 4.

A description will be given as to the action of the fuel vapor treatment system having the above-mentioned construction, referring to a flow chart illustrated in FIG. 5.

First, generation of the fuel vapor when the engine is stopped is the same as the example 1-1.

Next, a description will be provided of a method of treating fuel vapor adsorbed by the canister when the engine is started.

After the engine is started (the ignition (Ig) switch is turned on) (See steps S11, S12), the temperature of the reformer 7 is monitored and it is determined whether the temperature of the reformer is higher than 300° C. or not (See step S13). If the temperature of the reformer becomes higher than 300° C., a part of the exhaust gas is sent into the moisture vapor inflow port 24 of the canister through the path 16 (See step S14).

The fuel vapor adsorbed by the adsorbent inside the canister starts desorbing and it is sent into the reformer 7 from the gas exhaust port 22 by way of the path 14. In a transit period, the component of the reformed gas (desorbed gas) coming out of the reformer 7 varies, but when the component is stabilized, the reformed gas contains about 50% of $H_2$, about 25% of CO and about 25% of $CO_2$ in terms of a mole ratio. The reason the mole ratio is different from that of example 1-1 is that in example 1-1, moisture vapor alone is led in the reformer, but in example 1-2, $CO_2$ contained in the exhaust gas is led there at the same time. In addition, in the case where a reforming reaction contains methane, as in the example 1-1, the mole ratio of $H_2$ and CO responds accordingly.

The ratio of $H_2$ and CO, which are related to combustion, is lower than that of the example 1-1. If it affects stability and combustion of the engine, an injector is made to change the amount of injected liquid fuel from that of the example 1-1 and correction can be made. The reformed gas is sent into the induction pipe 4 of the engine through the purge control valve 3 to be burned and released into the atmosphere by way of the exhaust pipe 5.

When the amount of the fuel vapor adsorbed by the adsorbent inside the canister decreases on account of continued purge, the concentration of the fuel vapor in the path is lowered (See step S15). It is determined that the purge in the canister is completed and the inflow of the exhaust gas is stopped (See step S16).

After the purge in the canister is completed, it is desirable to add a sequence of controls that starts the moisture vapor generator, sends moisture vapor in the canister and checks the quantity of the moisture vapor adsorbed in the canister at certain intervals. If the amount of the adsorbed moisture vapor is judged to have increased, the above sequence of the operation is repeated.

In this example, purge gas (desorbing gas) contains $CO_2$, but knock resistance is not affected and as in example 1-1, ultra-lean burn is possible. The purge gas is likewise stable in excessive air conditions whose high compression ratio ranges from 14 to 16 and mixture ratio ranges from 40 to 50. Accordingly, as in example 1-1, it is possible to purge fuel vapor in the case of homogenous burn that requires torque, lean burn, and stratification burn in a direct-injection engine. This example can purge the vapor under any controlling operation of engines and besides, the invention makes it unnecessary to return to homogenous burn for purging and improves mileage.

Also, this example makes the water tank and the moisture vapor generator used in the example 1-1 unnecessary, since it uses exhaust gas as a source of supply of moisture vapor.

Example 1-3

Figure 6:
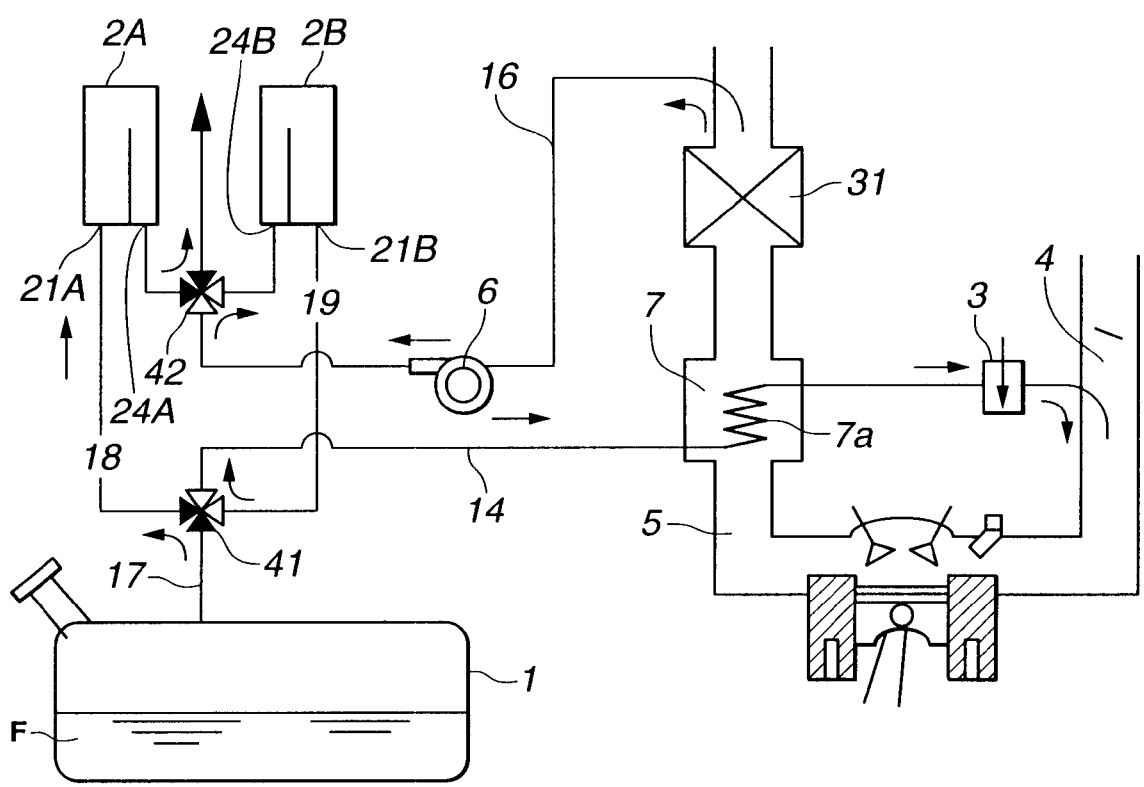
FIG. 6 is a cross-sectional view of a further example of the fuel vapor treatment system of the present invention, in a condition.
Figure 8:
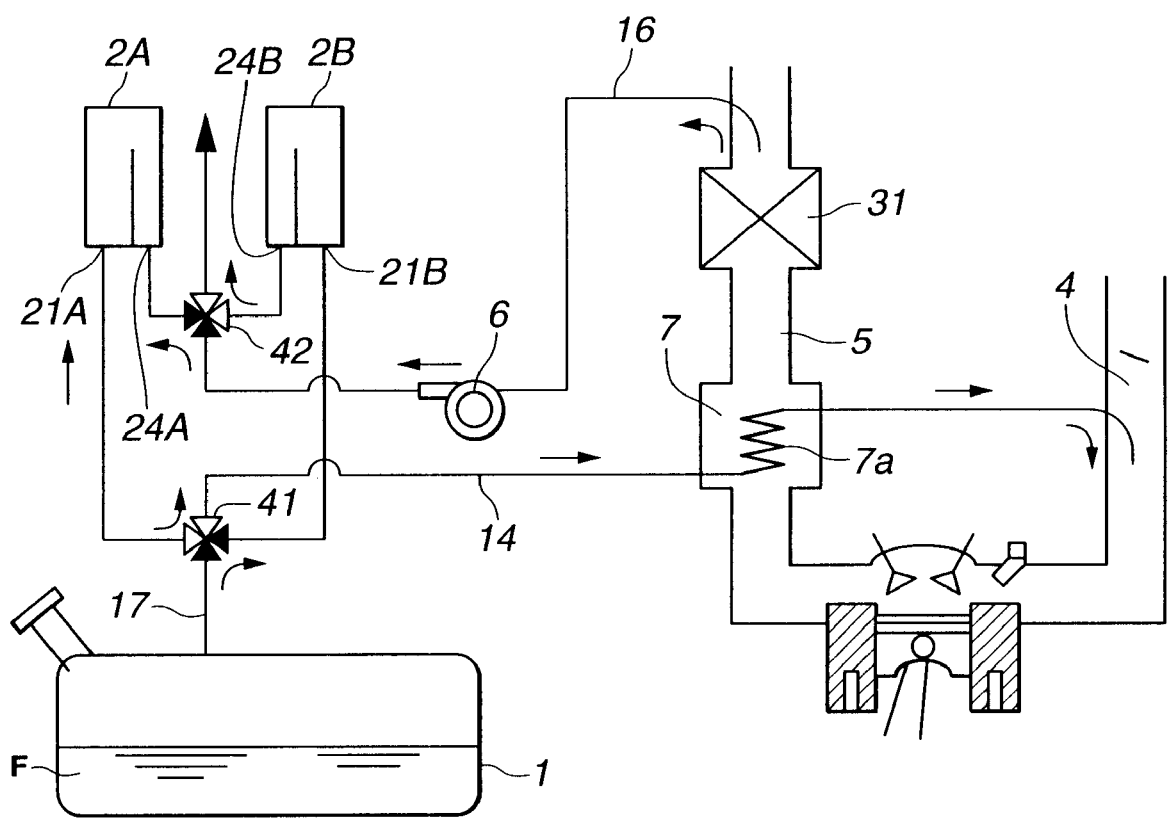
FIG. 8 is a cross-sectional view of the fuel vapor treatment system of FIG. 6, but in another condition.

FIGS. 6 and 8 are cross-sectional views of another example of the fuel vapor treatment system of the present invention, similar to the example 1-2. This example has two canisters 2A and 2B and carries out adsorption and desorption of fuel vapor by a swing or alternate operation and shows an example that can treat adsorption and desorption at the same time.

First, connection of the components will be discussed. As shown in FIG. 6, the two canisters 2A and 2B respectively comprise the fuel vapor inflow ports 21A and 21B, which are connected to the paths 17, 18 and 19 that lead fuel vapor from the fuel tank 1 in the canister. The canisters also have the moisture vapor inflow ports 24A and 24B, which lead moisture vapor or steam that purges fuel vapor adsorbed by activated carbon, the adsorbent. These inflow ports are connected to the path 16 to lead apart of the exhaust gas. Since in this example adsorption and desorption is performed by the swing operation, cross four-way valves 41 and 42 are placed in front of the fuel vapor inflow ports 21A and 21B and the moisture vapor inflow ports 24A and 24B respectively. Thus, fuel vapor can be adsorbed and desorbed by switching each valve.

Figure 7:
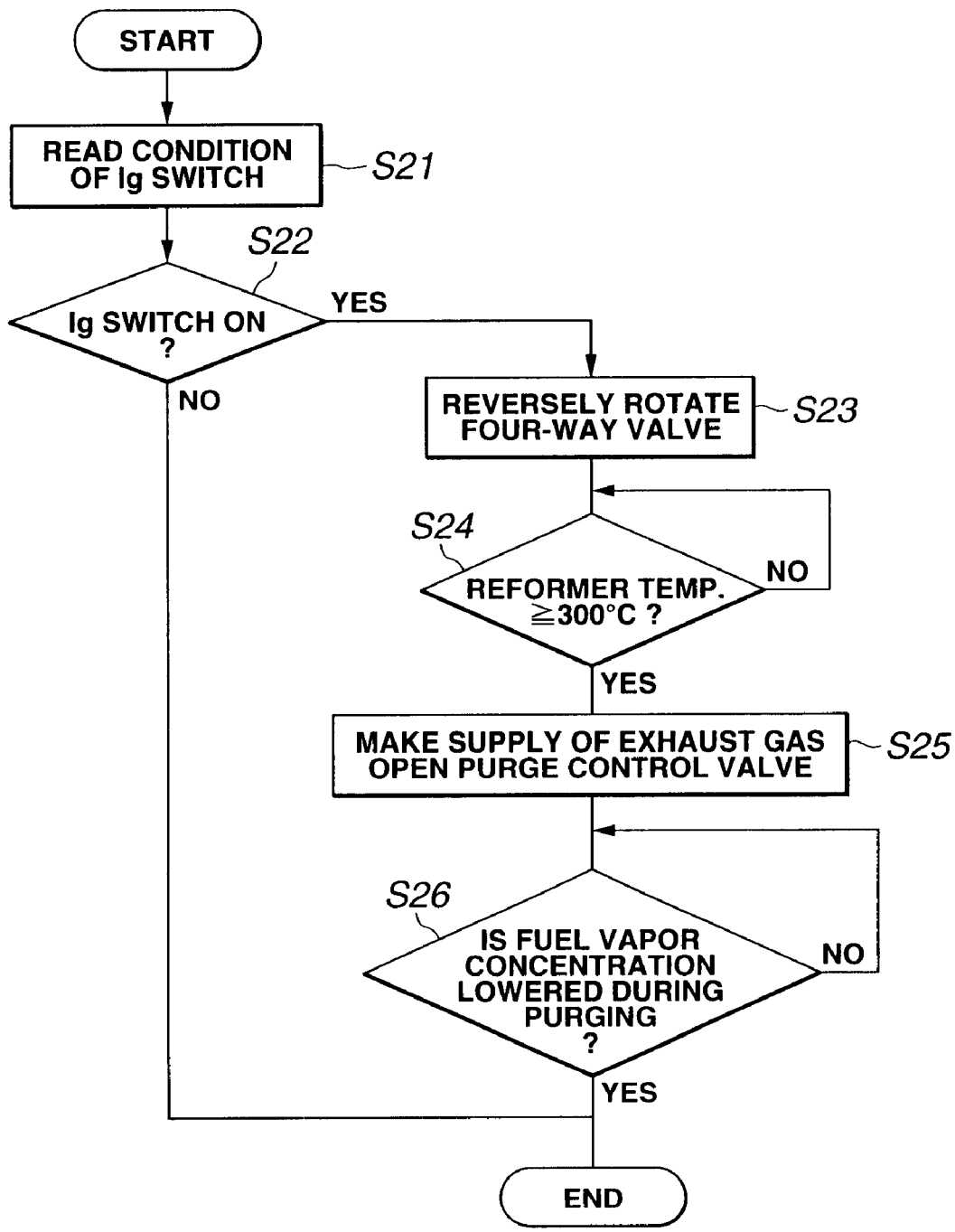
FIG. 7 is a flow chart showing a controlling example of the fuel vapor treatment system shown in FIGS. 6 and 8.

The action of the fuel vapor treatment system having the above-mentioned composition will be described, referring to a flow chart illustrated in FIG. 7.

First, generation of fuel vapor when the engine is stopped is the same as examples 1-1 and 1-2. However, in the example 1-3 the two canisters 2A and 2B are used and operates in an alternate manner in which they are alternately operated. Therefore, a description will given as shown in FIG. 6, where fuel vapor is set to be adsorbed by the canister 2A through the cross four-way valve 41.

A description will be provided of method of treating fuel vapor adsorbed by the canisters when the engine is started.

After the engine is started (the ignition (Ig) switch is turned on) (See steps S21, S22), the two cross four-way valves 41 and 42 are switched (See step S23). This operation aims at immediately desorbing the fuel vapor adsorbed when the engine is stopped. If the cross four-way valves are switched, gas starts to flow, as shown in FIG. 8.

Next the temperature of the reformer 7 is monitored and it is determined whether the temperature of the reformer is higher than 300° C. or not (See step S24). If the temperature of the reformer becomes higher than 300° C., a part of the exhaust gas is sent into the moisture vapor inflow port 24A of the canister 2A (See step S25). The fuel vapor adsorbed by the adsorbent inside the canister 2A starts desorbing and it is sent into the reformer 7 from the gas exhaust port 21A by way of the paths 18 and 14. The component ratio of the reformed gas coming out of the reformer is the same as that of the example 1-2. The reformed gas is sent into the induction pipe 4 of the engine through the purge control valve 3 to be burned and released into the atmosphere through the exhaust pipe 5 in the same way as example 1-2. Fuel vapor generated when the engine is turned on is adsorbed in the canister 2B through the cross four-way valve.

When the amount of the fuel vapor adsorbed by the adsorbent inside the canister 2A decreases on account of continued purging, the concentration of the fuel vapor in the path is lowered (See step S26). It is determined that the purge in the canister 2A is completed and the routine of the flow chart ends here and a new start is made. If the Ig switch is turned on, the two cross four-way valves are switched immediately.

When the cross four-way valves are switched, as is shown in FIG. 6, fuel vapor generated from the fuel tank 1 comes to be adsorbed by the canister 2A instead of the canister 2B. On the other hand, the inflow of exhaust gas containing moisture vapor goes to the canister 2B. The canister 2B has accumulation of adsorbed fuel vapor generated so far, but the inflow of the exhaust gas gradually starts to desorb the fuel vapor. When the amount of the fuel vapor adsorbed by the adsorbent inside the canister 2B decreases on account of continued purge, the concentration of the fuel vapor in the path 14 is lowered. It is determined that purge in the canister 2B is completed and the two cross four-way valves are switched immediately. The example returns to the original condition as shown in FIG. 8. A repetition of the above swing procedures enables adsorption and desorption to be performed by the separate canister and it is particularly effective when a great deal of fuel vapor is generated.

Example 1-4

FIG. 10 is a cross-sectional view of the other example of the fuel vapor treatment system of the present invention, similar to the example 1-1. The fuel vapor treatment system of the present example has two canisters 2, 2, and these canisters perform adsorption and reforming of fuel vapor at the same time by a swing operation.

The component of hydrocarbons adsorbed by the adsorbent (a means of adsorption) of the canister 2 generates hydrogen-rich gas by the reforming catalyst (hydrogen enriching means) at a reforming temperature higher than 260° C. and can specifically restrict generation of CO, a sub-product within a range between 350° C. and 380° C. as described above. Further, if the sub-product of CO is not considered, a higher hydrogen yield can be achieved within a higher temperature range that reaches 500° C. Accordingly, it is desirable to keep the above-mentioned hydrogen-enriching means in the temperature range between 260° C. and 380° C., more preferably, between 350° C. and 380° C.

The reforming reaction of such hydrogen-enriching means can be represented by the following equation Eq. 3 or 4, where HC in the equations represents hydrocarbons.

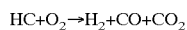
$$HC + O_2 \rightarrow H_2 + CO + CO_2 \qquad \text{Eq. 3}$$

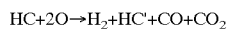
$$HC + 2O \rightarrow H_2 + HC' + CO + CO_2 \qquad \text{Eq. 4}$$

The action of the fuel vapor treatment system comprising the above-mentioned composition will be described below.

First, fuel vapor is generated inside the fuel tank 1 as described above, and is led by way of the path 11 to the canister 2 in the fuel vapor treatment system and adsorbed by the adsorbent inside the canister 2. In the case where the engine ignition switch is turned off at the time of fueling or parking, this phenomenon alone is observed.

Next, a description will be provided of a method of treating adsorbed fuel vapor.

In this example of the fuel vapor treatment system, the possibility of reforming (represented by Eq. 3 or 4) is based on whether or not the temperature of the hydrogen-enriching means placed in the canister 2 is higher than 350° C. when the engine is started.

In this event, a heating mechanism can be used so that the temperature of the hydrogen-enriching means becomes higher than 350° C. within a specific period of time after the engine is started. For instance, waste heat of the heat exchanger 71 can be collected and used to heat up the adsorber and reformer 70 placed in the canister 2.

If the temperature of the hydrogen-enriching means is higher than 350° C., carrier gas or purge gas is sent to the canister 2 by the blower 6 and purges generated hydrogen-rich gas. Purged hydrogen-rich gas is supplied to the inlet of the catalyst for purifying NOx in the exhaust gas, directly or by way of a hydrogen-rich gas storage tank, by the injector 61 according to need.

In addition, air can be sent in as carrier gas (purge gas), but if exhaust gas is used, co-existing moisture vapor can be used for the reaction and is beneficial in terms of an H2 yield and a life of the catalysts.

Also, it is desirable to control the temperature of the reforming reaction according to the temperature of the inlet of the catalyst for purifying NOx.

Specifically, in the case where the temperature of the inlet of the catalyst for purifying NOx (the temperature of exhaust gas that goes through the exhaust pipe 5) is lower than 250° C., it is desirable to keep the temperature of the reforming catalyst (the temperature of the reforming reaction) in a range between 260° C. and 380° C., more preferably between 350° C. and 380° C. from the standpoint of efficiency of NOx purification. In this case, the injector 61 can be feedback controlled so that hydrogen-rich gas may be supplied in a spike-like manner according to air-fuel ratio of exhaust gas.

On the other hand, in the case where the temperature of the inlet of the catalyst for purifying NOx is higher than 500° C., it is preferable to keep the reforming catalyst in a range between 350° C. and 500° C. from the standpoint of clearing away sulfur poison adsorbed by the catalyst for purifying NOx.

Further, the adsorber and reformer 70 has two canisters 2 where an HC adsorbent or adsorbing material (a means of adsorbing fuel vapor) and Rh catalyst (hydrogen-enriching means) are placed. Accordingly, when one canister performs a reforming reaction, the other canister can carry out the adsorption process. Therefore, when fuel vapor reaches a point of saturation is during the adsorption process, a so-called breakthrough happens, but driving can be continued by detection in advance, switching of the valve 51 and shifting to a reforming reaction mode.

As described above, it was impossible to purge hydrocarbons vapor at the time of ultra-lean burn. However, if hydrogen-rich gas is used for purifying NOx as in this example, it can save the process in which ultra-lean burn is returned into homogenous charge combustion for purging and that process was a problem in the past regarding the canister techniques. Besides, higher purge efficiency is achieved since fuel vapor is purged after the adsorbed HC (hydrocarbons) goes through a reforming reaction. The example can also contribute to a drastic improvement in the performance of the canister and making the system more compact by the integration of the canister and the reformer.

Also, this example makes it possible to reduce nitrogen oxides (NOx), which was a problem in the lean exhaust gas. Particularly it achieves high efficiency of NOx reduction at a low temperature of exhaust gas, lower than 250° C., which was difficult in the past techniques and facilitates activation of the old and deteriorated catalyst for purifying NOx and contributes to the improvement of the mileage.

In other words, by adopting the arrangement of supplying the above-mentioned hydrogen-rich gas to the catalyst for purifying the exhaust gas placed in the exhaust pipe (exhaust gas passageway) of the internal combustion engine, this example of the fuel vapor treatment system can realize a high-performance canister. The example can suitably function as an exhaust gas purification system, particularly a NOx purification system for exhaust gas due to lean-burn.

In addition, if something flows against the flow of the passing gas and hampers the flow, a check valve can properly be placed in the middle of each path of the above-mentioned examples 1-1 to 1-4.

Also, if the amount of flow of each component needs to be controlled in reforming and leading reformed gas and hydrogen-rich gas to the induction pipe of the engine, flow amount control valves can also be placed.

Detailed description was given as to the present invention above, referring to several of the best examples, but the present invention is not limited to these examples, and various variations can be made within the scope of the summary of the present invention.

Figure 9:
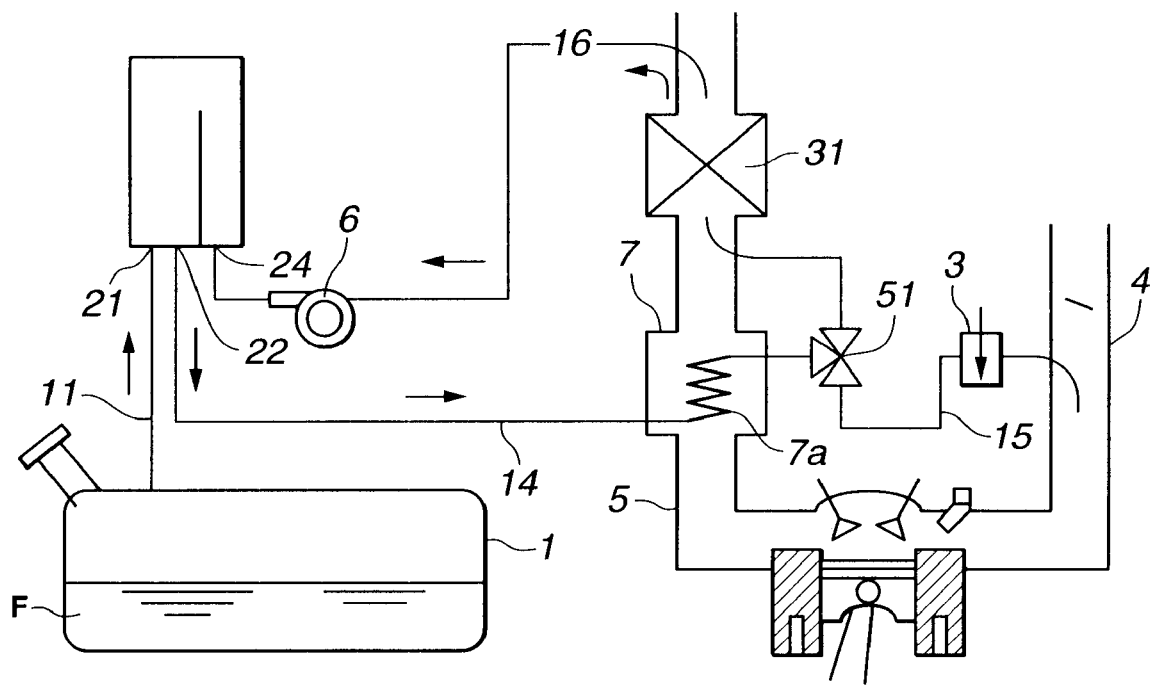
FIG. 9 is a cross-sectional view of a further example of the fuel vapor treatment system of the present invention.

For instance, as shown in FIG. 9, the three-way valve 51 is placed in the middle of the path connecting the reformer and the induction pipe 4 of the engine and one is connected to the induction pipe and the other to the upstream of the catalyst of the exhaust pipe. In recent lean-burn engines and direct-injection engines, catalysts for trapping NOx have been used. By sending hydrogen and carbon monoxide-rich reformed gas upstream of the catalyst for trapping NOx according to need, this example allows recovery of catalytic performance of the catalysts for adsorbing NOx on account of the reduction of NOx.

If the reformed gas is allocated to the induction pipe 4 and the exhaust pipe 5 of the engine by the three-way valve 51, performance of purifying the exhaust gas as well as mileage can be improved.

Also, in the fuel vapor treatment system shown in FIG. 10, an injector 61A similar to the injector 61 may be provided upstream of the internal combustion engine so that hydrogen gas is combusted in the internal combustion engine. The injector 61A is connected to the path 14 to be supplied with gas from the canister 70. Further, an inflow port for purge gas can be placed separate from the fuel vapor inflow port 21. In addition to the above, it is possible to set more than three canisters 2 and perform swing operation.

As described above, according to the present invention illustrated in FIGS. 1 to 10, moisture vapor is used as gas for purging fuel vapor, and this moisture vapor is also used for reforming fuel vapor, or for supplying hydrogen-rich gas to the catalyst for purifying NOx. Therefore, the present invention can provide a fuel vapor treatment system and an exhaust gas purification system that can improve mileage and achieve high efficiency in reducing and purifying NOx at a low temperature, without affecting the air-fuel ratio set in advance or exerting any bad effects on the operation features of the internal combustion engines or on the components of exhaust gas.

In other words, the invention effectively purges fuel vapor adsorbed by the canister with moisture vapor and turns the desorbed gas containing moisture vapor into reformed gas containing hydrogen and carbon monoxide through the reforming reaction with moisture vapor. Thus, it can give combustion treatment to hydrocarbons vapor at the time of ultra-lean burn, which has been conventionally used to be impossible, and can construct a fuel vapor treatment system that does not exert any bad effects on the mileage and performance of emission. Besides, the invention combines a means of adsorbing fuel vapor and a means of enriching hydrogen and turns the adsorbed fuel vapor into hydrogen-rich gas through the reforming reaction. It also purges this hydrogen-rich gas effectively. Therefore, efficient NOx purification can be realized and it becomes possible to construct a fuel vapor treatment system that does not exert any bad effects on the mileage and performance of emission.

Next, referring now to FIGS. 11 to 23, fuel vapor treatment (recovery) system according to another aspect of the present invention will be discussed.

The fuel vapor recovery system of this aspect comprises a canister containing a fuel vapor adsorbing material and having a portion defining an inflow port through which fuel vapor from a fuel tank of an engine is flown to the fuel vapor adsorbing material, a portion defining a gas introduction port though which a gas for purging fuel vapor adsorbed in the fuel vapor adsorbing material is introduced into the canister, and a portion defining an outflow port through which fuel vapor purged from the fuel vapor adsorbing material is flown out of the canister. A membrane separation module is provided to be connected to the canister and including a separation membrane for separating a mixture gas into an air-rich component and a fuel vapor-rich component. The separation membrane has an air-selective permeability so that the air-rich component is be able to pass through the separation membrane, the mixture gas containing air and fuel vapor. The membrane separation module has a portion defining an air-rich component discharge port through which the air-rich component is discharged out of the membrane separation module, and a portion defining a fuel-rich component discharge port through which the fuel-rich component is discharged out of the membrane separation module.

Additionally, the fuel vapor recovery system comprises a gas transporting or supplying device connected to the canister, for causing the purge gas to be introduced into the canister to purge fuel vapor from the fuel vapor adsorbing material and causing the purged fuel vapor to be fed to the membrane separation module. Here, the fuel vapor-rich component discharge port of the membrane separation module is connected to an intake air passageway of an engine so that vacuum generated by the engine acts on the separation membrane so as to serve as a driving force for membrane separation. Further, the air-rich component discharge port of the membrane separation module is connected to the fuel tank so that fuel vapor component contained in the fuel vapor-rich component is recovered to the fuel tank upon being subjected to at least one of liquefaction and absorption to liquid fuel in the fuel tank. The engine in this instance is an internal combustion engine of an automotive vehicle.

As described above, this fuel vapor recovery system comprises the canister that adsorbs and retains fuel vapor from a fuel tank as well as purges and emits adsorbed fuel vapor with purge gas (a representative example is air), the membrane separation module that separates fuel vapor coming out of said canister into an air-rich component and a fuel vapor component, and a gas carrying means (purge gas) that lead the above-mentioned purge gas and supplies the purged fuel vapor to said membrane separation module.

The fuel vapor recovery system of the present invention is characterized in that it uses negative pressure or vacuum of an engine as a driving force of membrane separation. By using the negative pressure of the engine it does not need a vacuum pump to be separately installed, for it can generate the negative pressure up to approximately 500 mmHg relatively easily in intake stroke of cylinders of the engine.

Also, in using the negative pressure of the engine, the permeable side of the separation membrane of the membrane separation module is required to be connected to an induction or intake pipe (intake air passageway) of an engine. The membrane separation module is of the air selectively permeable type wherein air can be selectively permeate the separation membrane, so that air and fuel vapor are respectively put into the permeable and impermeable side of the separation membrane. Unless the membrane separation module of the air selectively permeable type separates the air-rich component on the permeable side and the fuel vapor-rich component on the impermeable side, as described above, inaccurately measured fuel is led into the induction pipe of the engine and affects the air-fuel ratio of air-fuel mixture to be supplied to the engine. It is important to use such a membrane separation module of this type.

More specifically, if such a membrane separation module of air selectively permeable type is used, the component on the permeable side has either air alone or a very low concentration of fuel vapor, if any. Accordingly, the air-fuel ratio is scarcely affected though negative pressure is used for leading the fuel vapor into the induction pipe of the engine.

As described above, the present invention uses negative pressure or vacuum generated in the engine as a driving force of membrane separation, but this negative (engine) pressure is generated in intake stroke only of the engine and is not generated in other strokes. Therefore, it is desirable to set a control valve, which is opened only when the negative pressure is below a certain level, in a gas path that connects a port for exhausting the air-rich component and the induction pipe of the engine, placed on the permeable side of the membrane separation module, so that the negative pressure of the engine may always be used as a driving force of the membrane separation module.

Preferably, the negative pressure of the engine is 300 mmHg to 500 mmHg. Pressure below 300 mmHg is not sufficient as a driving force of membrane separation and cannot always achieve a required separation speed. In addition, a separation coefficient is sometimes lowered although speed is acquired by making a separation membrane coarse. Pressure above 500 mmHg is not desired, either, for a higher load is applied on the engine and a vacuum pump is separately required.

Further, if a chamber is set between the control valve, which is opened only when the negative pressure is below a certain level, and the membrane separation module, it is possible to alleviate fluctuations of the negative engine pressure and to control the fluctuations of the negative pressure loaded on the membrane separation module.

The fuel vapor recovery system of the present invention uses the above-mentioned gas(purge gas)-carrying (transporting or supplying) means. The important feature of this system is that it can lead purge gas to the canister and supply purged fuel vapor to the membrane separation module at nearly normal pressures according to need while saving energy. In this regard, this unit differs from a so-called vacuum pump which intakes and emits gas at elevated or reduced pressures and consumes a good deal of energy, and tends to be larger in size and heavier in weight.

Blowers, fans or ventilators can be used as such gas-carrying means. The means can be installed (1) upstream of the gas inflow port of the canister, (2) between the exhaust port of the canister and the gas inflow port of the membrane separation module, or (3) downstream of the outflow port for exhausting fuel vapor-rich component, set on the impermeable side of the membrane separation module. If the means are placed at least at one point of the above points, purged fuel vapor can be led from the canister to the membrane separation module.

However, in the case of (1), when the engine is stopped and the blower is not working, for instance, at the time of parking or fueling, it is necessary to make gas flow backward from the port to rid the tank of the gas. An arrangement that enables gas to flow backward inside the blower is required. An exhaust path having a valve should be placed next to the gas inflow port and the inflow and emission of gas may separately be allocated. In the above case, the valve should be closed when the blower is working.

It is necessary to regulate the quantity of gas flowing through the exhaust or outflow port on the permeable side of the membrane separation module (port for exhausting air-rich component) and the quantity of gas flowing through the exhaust port on the impermeable side (port for exhausting fuel vapor-rich component). Its purpose is to make the above-mentioned membrane separation module function efficiently. In the fuel vapor recovery system of the present invention it is desirable to control the quantity of gas flow so that the ratio between the quantity of gas flow on the permeable side and that on the impermeable side may fall within a range of 0:10 to 5:5.

In addition, the quantity of gas flow on the permeable side is determined to some extent by the amount of the negative engine pressure and a coefficient of permeability of the membrane separation module. Thus, it is desirable that the control on the above-mentioned quantity of gas flow be performed by control of the quantity of gas flow on the impermeable side or the quantity of gas inflow of the membrane separation module. The gas flow can be controlled if a gas flow control valve is set at least at one point, either upstream of the fuel vapor inflow port of the membrane separation module, or downstream of the port for exhausting the fuel vapor-rich component, placed on the impermeable side of the membrane separation module. The gas flow can also be controlled if the carrying capacity of the above gas-carrying means is made variable and the capacity is changed.

In this fuel vapor recovery system, the port for exhausting the fuel vapor-rich component, set on the impermeable side of the membrane separation module, is connected to the fuel tank in order to collect fuel vapor. However, it is possible to set a cooling module at the midpoint and collect fuel vapor after the fuel component is liquefied and returned to the fuel tank.

In this case, a cooling method includes liquefying collection after cooling the fuel vapor-rich component by the use of electronic cooling elements other than the use of a cooling medium used in air conditioners of the vehicle or sending cool air from the air conditioners to a condensing module.

On the other hand, it is possible to have liquefied fuel in the fuel tank adsorb fuel vapor and collect it by bubbling if the port for exhausting the fuel vapor-rich component is directly connected to the fuel tank. In the present invention, since the gas component of the impermeable side of the membrane separation module, in particular, is a component in which the fuel component is concentrated, excellent absorption efficiency is obtained.

When the concentration of the fuel vapor supplied to the membrane separation module exceeds a certain concentration (for instance, fuel vapor takes up more than 80%) in the fuel vapor recovery system of the present invention, the system can stop a driving force of the membrane separation module and let the entire quantity of the gas flow toward the impermeable side according to need, in order to prevent fuel vapor from breaking into the permeable side of the membrane separation module.

The above-mentioned separation membranes have an air-selective permeability which is such an ability that air is selectively permeable through the separation membranes. The separation membranes used for the membrane separation module are not limited as long as they have air-selective permeability. The separation membrane is formed of material (1) such as silica, alumina, zeolite, ZSM or aluminophosphate-based molecular sieves (such as ALPO, SAPO, TAPO and FAPO) or any combination of the above materials, or material (2) such as single membranes or compound hybrid membranes of silicon, carbonized membranes of pyrolytic polymeric plastic, mordenite membranes and ferrierite membranes as well as membranes containing inorganic materials. The separation membrane may be formed of a combination of the materials (1) and the membranes (2). The separation membrane is preferably the molecular sieve-type membrane that separates the air component containing nitrogen and oxygen, which are chiefly made up of relatively small-sized molecules, and the fuel component containing hydrocarbons, which is made up of relatively larger molecules.

In terms of the shape, such separation membranes include flat membranes, spiral membranes, hollow fiber membranes and a tubular base coated with the above inorganic materials. The shape of the membranes is not limited to a particular shape and an appropriate shape is chosen from the standpoint of quantity of fuel vapor treatment, space and cost.

The separation membrane module is preferably 5 or higher in separation coefficient or separation ratio (mole ratio) which is a ratio between air and fuel vapor (air/fuel vapor. More preferably, the separation membrane has the separation ratio of approximately 20. If so, even in the case where the concentration of fuel vapor is high, effects on the operation performance and emission performance of the engine are restricted, because the concentration of fuel vapor on the permeable side can be kept low.

For instance, assuming that the separation coefficient is 5, the ratio between an quantity of flow on the permeable side and an quantity of flow on the impermeable side is 3:7, and fuel vapor is supplied to the membrane separation module at the concentration of 50%, the concentration of fuel vapor on the permeable side is decreased below 20% or less. Also, assuming that the separation coefficient is 20 on the same conditions, the concentration of fuel vapor on the permeable side is decreased to 5% or less.

Further, in the case where fuel vapor is supplied at 80%, the concentration of fuel vapor on the permeable side is nearly 50% or less if the separation coefficient is 5. If the separation coefficient is 20 on the same condition, the concentration of fuel vapor on the permeable side becomes 20% or less at last. In this case, according to need, the quantity of flow on the permeable side is decreased (for instance, the ratio of quantity of flow on the permeable side: the quantity of flow on the impermeable side should be set at 1:9). A complete stop or a reduction of supply amount to the separation membrane module can control the quantity of flow and avoid too much inflow of fuel vapor of a high concentration into engines.

The fuel vapor recovery system of the present invention has the above-mentioned arrangement. If the burden of the canister is heavy and purging needs to be carried out quickly at the time of long term parking or a traffic jam in summer, a by-pass may be set from the canister to the induction pipe of the engine in advance, in which a control for accomplishing positive combustion of fuel vapor may be added when torque is required at the time of starting or speedup.

EXAMPLES

The present invention of this aspect will be more readily understood with reference to the following Examples in comparison with Comparative Examples; however, these Examples are intended to illustrate the invention and are not to be construed to limit the scope of the invention.

Example 2-1

Figure 11:
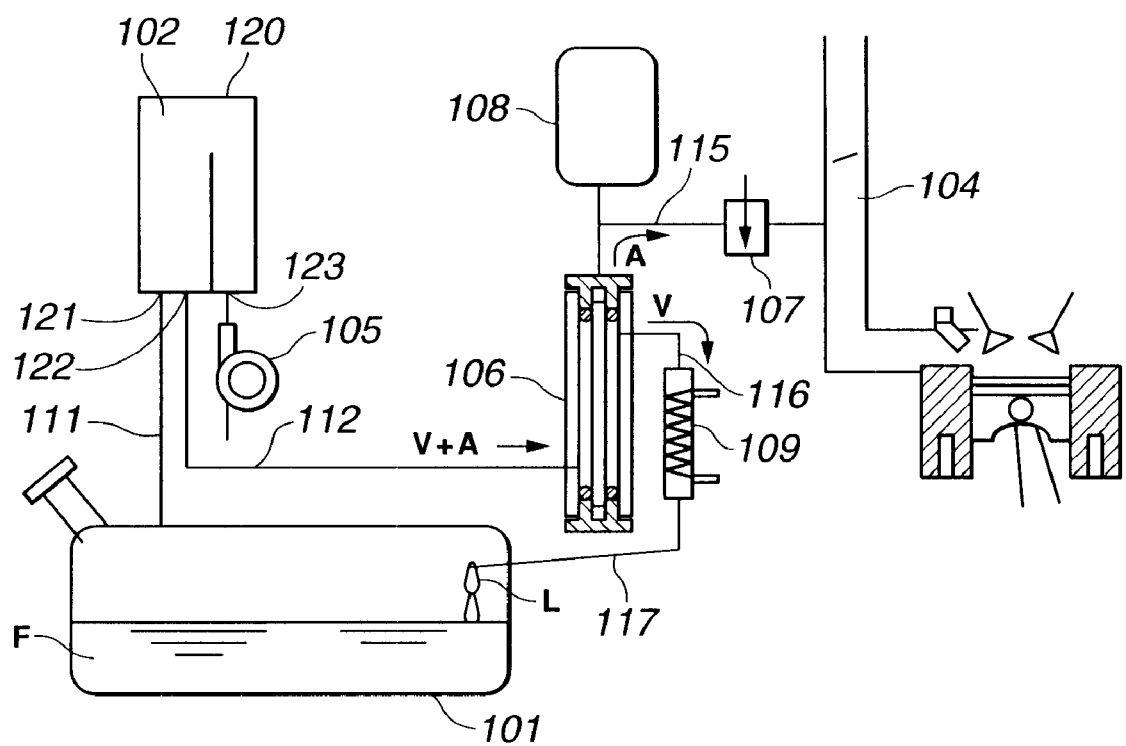
FIG. 11 is a cross-sectional view of an example of a fuel vapor recovery system of the present invention.

FIG. 11 shows an example of the fuel vapor recovery system of the present invention. The system shown in the drawing is used for a system where fuel vapor generated by a fuel tank set in an automobile which runs on gasoline or light oil (diesel fuel), or fuel vapor containing air and generated by purging at the canister, is condensed by the use of the membrane separation module before being adsorbed and collected by the fuel in the fuel tank. The system chiefly comprises a canister 102, a blower 105 as a gas (purge gas)-carrying or transporting means, a membrane separation module 106, a negative pressure (vacuum) control valve 107 that controls the negative pressure or vacuum generated by the engine, and a cooling module 109 for liquefying fuel vapor of a high concentration.

First, connection among these components will be described.

The canister 102 comprises a container 120, an inflow port 121 connecting a path 111, which leads fuel vapor from the fuel tank 101, to the container 120, a gas inflow port 123 that leads purge gas, which purges fuel vapor adsorbed by activated carbon, an example of an adsorption means that adsorbs flowed-in fuel vapor, and an exhaust port 122 that emits gas containing fuel vapor purged inside the container 120. Also, a blower 105 as the gas-carrying means is connected to the gas inflow port 123 of the canister 102.

The membrane separation module 106 divides gas containing fuel vapor V and air A, which flows in through the path 112 from the exhaust port 122 of the canister, into the air(A)-rich component (air containing little fuel vapor) and the fuel vapor(V)-rich component (fuel vapor of a high concentration). In FIG. 11, the reference character L indicates liquefied liquid fuel.

Figure 12A:
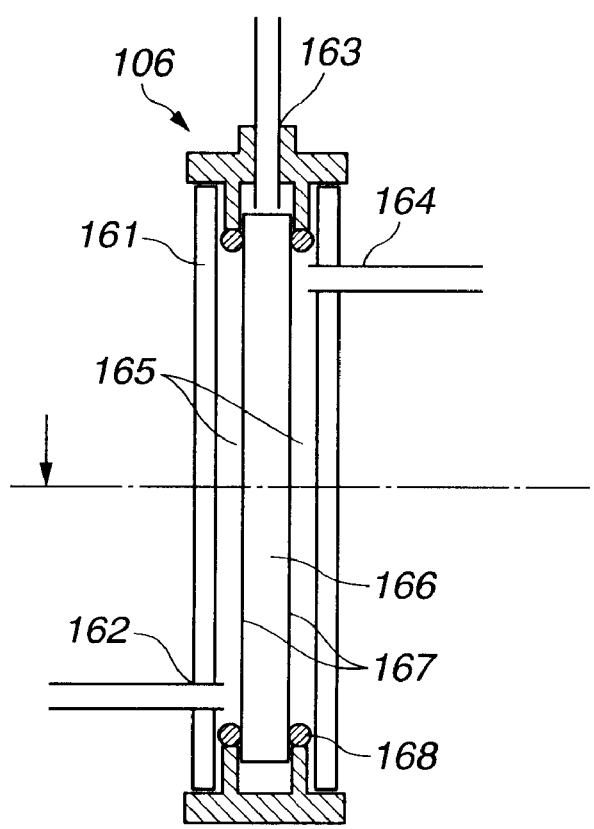
FIG. 12A is a vertical sectional view of an example of a membrane separation module of the fuel vapor recovery system of FIG. 11.
Figure 12B:
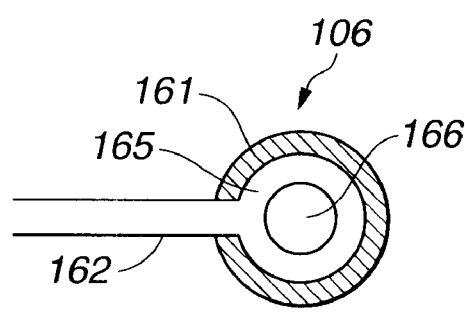
FIG. 12B is a sectional view taken in the direction of an arrow substantially along the dash-dot line of FIG. 12A.

FIGS. 12A and 12B are respectively vertical and horizontal sectional views of the membrane separation module used in the system of this example. This membrane separation module 106 is formed with an outer space 165 and an inner space 166, and has an arrangement of the double tube structure. The module 106 has a tubular porous base or substrate (not shown) coated with a separation membrane 167, and an O ring 168 as a spacer is applied to the obtained tubular separation membrane 167, which is housed by a module case 161. Also, the fuel vapor inflow port 162 is connected to the outer space 165. The exhaust or outflow port on the permeable side (port for exhausting the air-rich component) 163 is connected to the inner space 166, and the exhaust port on the permeable side 163 is connected to the induction pipe 104 by way of the path 115. (See FIG. 11.)

Accordingly, in this membrane separation module, a driving force based on the negative pressure of the engine works so that gas may flow from the outer space 165 to the inner space 166.

As described above, materials used as separation membranes include inorganic single or combined hybrid membranes of molecular sieves, silicon, pyrolytic carbonized membranes, mordenite membranes, and ferrierite membranes and the like. Such membranes allow selective permeability of the air component containing nitrogen and oxygen, which are chiefly made up of relatively small molecules.

Accordingly, the exhaust port 163 on the permeable side of this membrane separation module 106 releases the air-rich component A and the exhaust port on the impermeable side 164 (port for exhausting the fuel vapor rich component) releases the fuel vapor rich component V.

The exhaust port on the impermeable side 164, which releases the fuel vapor rich component V, is connected to the cooling module 109 and a path 117 is set to liquefy a part of the released gas and collect it in the fuel tank 101.

For the cooling module 109, a spiral pipe is placed in the module case of the module 109 to accomplish heat exchange or cool the fuel vapor-rich component, by flowing coolant of air conditioners of the vehicle to the cooling module. The cooling module 109 may be supplied with cool air from the air conditioners. Electronic cooling elements may be used for the cooling module.

On the other hand, the exhaust port on the permeable side 163, which releases the air-rich component A, is connected to the induction pipe 104 of the engine. The negative pressure generated in an adsorption process of the engine can be used as a driving force of the membrane separation.

In the system of the present invention, a negative pressure control valve 107 is placed between the exhaust port on the permeable side 163 of the membrane separation module 106 and the induction pipe 104, for the purpose of keeping the differential pressure of the driving force of the membrane separation around 300 to 500 mmHg.

Further, it is possible to have the negative pressure control valve 107 work with the adsorption process of the engine and have it opened only when the pressure is below a certain negative pressure. In addition, a negative pressure chamber 108 can be placed between the negative pressure control valve 107 and the exhaust port on the permeable side 163 of the membrane separation module.

Figure 13:
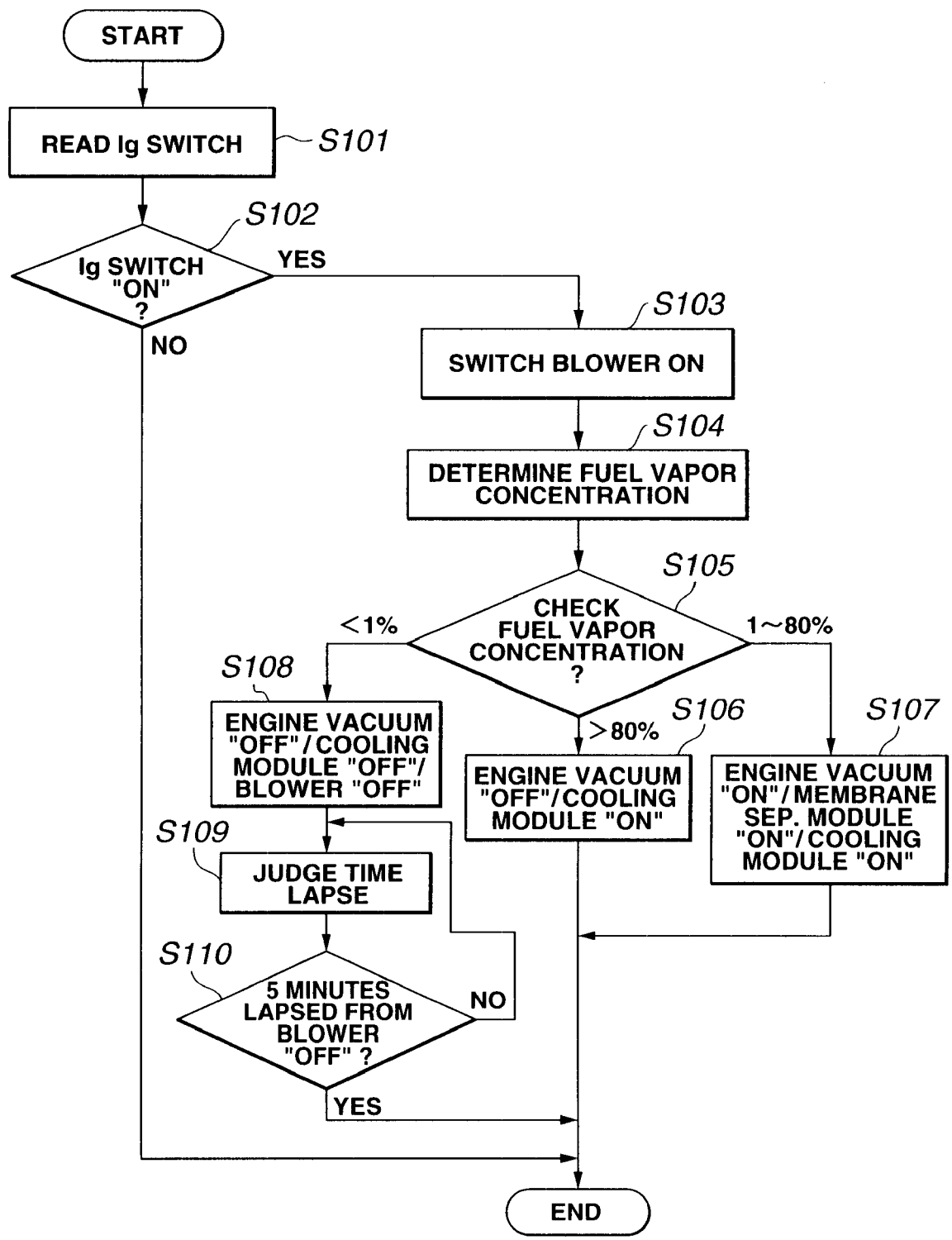
FIG. 13 is a flow chart showing a controlling example of the fuel vapor recovery system shown in FIG. 11.

The operation of the fuel vapor recovery system having the above composition will be described, based on the flow chart shown in FIG. 13.

First, as for the generation of fuel vapor when the ignition switch (Ig) of the engine is turned off, in other words, when the engine is stopped, this phenomenon happens mainly when the temperature of fuel inside the fuel tank 101 rises at the time of parking or fueling. The adsorbent inside the canister 102 adsorbs fuel vapor generated in the fuel tank 101 by way of the inflow port 121 of the canister 102.

Pressure inside the tank increases due to the generation of fuel vapor. Fuel vapor flows backward through the gas inflow port 123 of the canister and is released into the atmosphere. In this case, in the flow chart shown, the reply to a question, as to whether or not the Ig switch is switched on (See step S102)so that a flow goes to NO upon reading the Ig switch (See step S101). Therefore, the routine of this flow chart ends.

Next, a description will be given as to a method of collecting fuel vapor adsorbed by the canister 102 by starting the engine.

When the engine is started (the ignition (Ig) switch is turned on), the reply to the question regarding the Ig switch is YES (See step S102). The blower 105, which is a gas carrying means, is started (See step S103) to send a certain quantity of atmosphere to the canister 102 through the gas inflow port 123. Fuel vapor adsorbed by the adsorbent inside the canister 102 starts desorption and is sent to the fuel vapor inflow port 162 of the membrane separation module 106 out of the gas exhaust port 122 by way of the path 112.

Next, the concentration of the gas containing purged fuel vapor is determined (See step S104). The concentration may be learned by the use of a fuel vapor sensor placed upstream of the membrane separation module 106 or by prediction on the basis of empirical rules obtained by experiments using vehicles.

The concentration of fuel vapor is checked in step S105, and if the concentration of fuel vapor exceeds 80%, the negative pressure of the engine is considered to be OFF (cut or interrupted), and the cooling module is to be ON (operated). The entire component is designed to be emitted through the exhaust port on the impermeable side 164 of the membrane separation module 106 and the entire component is sent to the cooling module 109 to start liquefying collection (See step 106) and ends the routine of the flow chart.

The reason why separation is not carried out by the membrane separation module 106 when the concentration exceeds 80% is that when the concentration exceeds 80%, liquefying collection of fuel is made possible simply by cooling. Also, when the concentration exceeds 80%, the quantity of air that goes through the membrane decreases and the burden on the membrane separation module 106 becomes heavier.

On the one hand, in the case where the concentration of fuel vapor falls within the range of 1 to 80%, the negative pressure of the engine is considered to be ON (supplied). The membrane separation module 106 is ON (started or operated) and the cooling module 109 is also turned ON (operated) in the step S107.

This starts separation in the membrane separation module 106. After condensed fuel component is blown out of the exhaust port on the impermeable side 164 to the cooling module 109 by way of the path 116 and liquefied, it goes back to the fuel tank 101 to be collected there and the routine of the flow chart ends. In this case, only the air component or the air-rich component is found on the permeable side of the membrane separation module 106. Although negative pressure is used as a driving force of the membrane separation module 106, little fuel vapor is sent to the induction pipe 104 and exerts little effect on the air-fuel ratio.

In repeating the above routine, it is expected that in some cases the concentration of fuel vapor will be below 1%, according to the environmental or operational conditions. In such cases it is determined either that there is no need to purge or that purge is completed, and the blower 105 is turned OFF (stopped). If the negative pressure of the engine and the cooling module are ON, they are turned OFF (cut and stopped) and collection is terminated (See step S108). Collection is stopped so as to save unnecessary energy when collection is not needed and to prevent deterioration in achievable mileage.

Next, time judgment is made (See step S109). Time after the blower 105 is turned off is clocked and when a certain period of time passes, the routine of the flow chart is ended.

Time judgement is needed to avoid frequent switching on and off of the blower 105 as well as frequent checking of the concentration. In this example the routine is stopped in five minutes (See step S110). This length of time is not particularly confined, but setting it too long is not desirable since it is expected that while collection is suspended, the canister might adsorb a large amount of fuel vapor.

According to the above treatment based on the flow chart, if the engine is started, repetition of the above cycles enables fuel vapor stored by the canister to be purged gradually and fueling and long term parking can properly be prepared for.

In this example, the concentration is checked every five minutes at the longest. Therefore, even though there is a fluctuation in the amount of generated fuel vapor due to changes of the driving conditions or the environment, it is possible to select a collection method appropriate for the circumstances immediately and to collect fuel vapor.

Example 2-2

Figure 14:
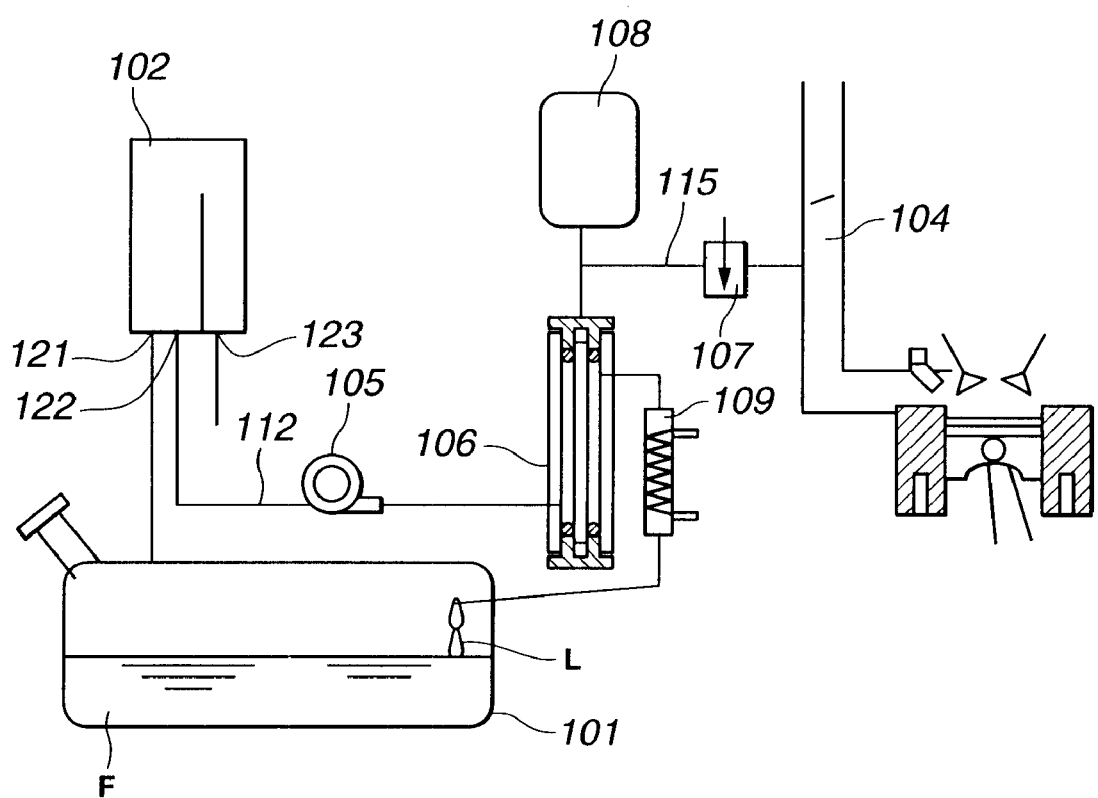
FIG. 14 is a cross-sectional view of another example of the fuel vapor recovery system of the present invention.

FIG. 14 is a cross-sectional view showing another example of the fuel vapor recovery system of the present invention. The system of this example has the same composition as the system of example 2-1, except that the blower 105, which is a gas carrying means, is placed upstream of the membrane separation module 106 (between the exhaust port 122 of the canister and the fuel vapor inflow port 162 of the membrane separation module).

The operation of the system of this example will be described below.

First, the generation of fuel vapor is the same as the example 2-1. Next, description will be given as to a method of collecting fuel vapor adsorbed by the canister 102 by staring the engine.

As soon as the engine is started, the blower 105, which is a gas carrying means, is started. As the blower 105 is started, a prescribed amount of flow is adsorbed through the exhaust port 122 of the canister and air is blown into the canister through the gas inflow port 123. As air is blown in, fuel vapor adsorbed by activated carbon inside the canister 102 will be purged and fuel vapor will flow into the membrane separation module 106 by way of the path 112. Further, the operation at the membrane separation module 106 and the operation of collection are the same as the example 2-1.

Example 2-3

Figure 15:
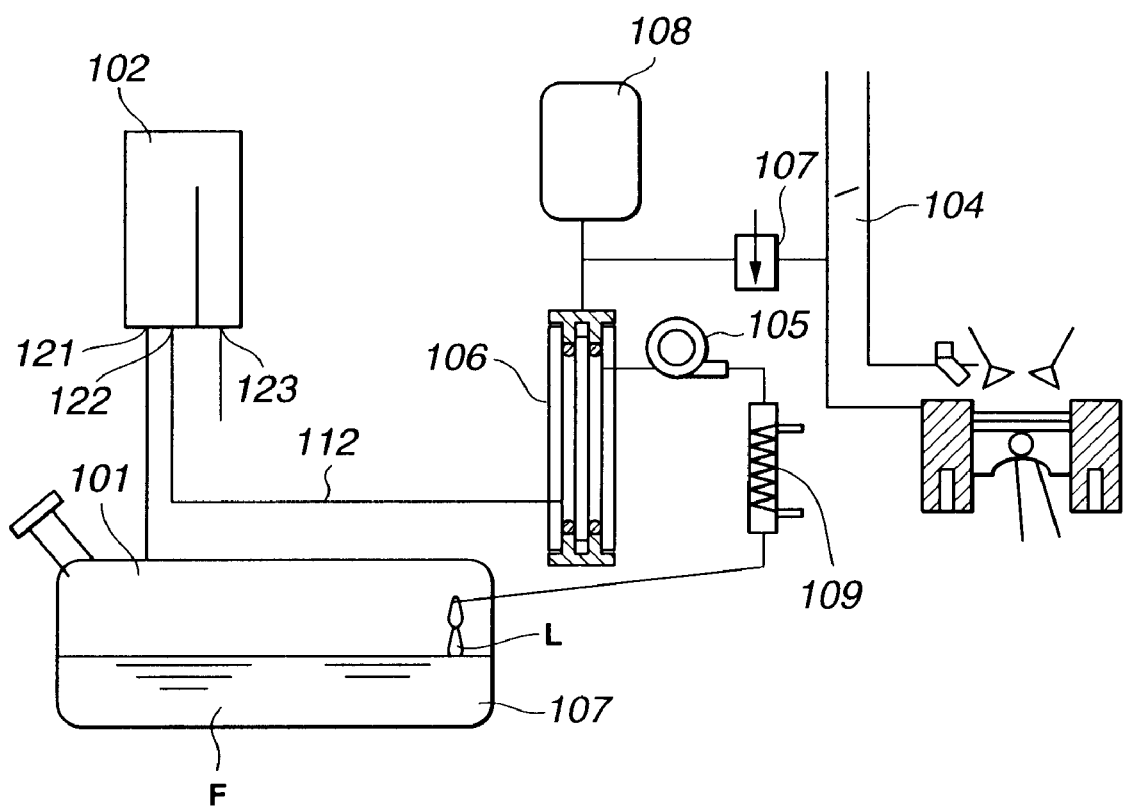
FIG. 15 is a cross-sectional view of a further example of the fuel vapor recovery system of the present invention.

FIG. 15 shows another example of the fuel vapor recovery system of the present invention. The system of the present invention has the same composition as the example 2-1, except that the blower 105, which is a gas carrying means, is placed downstream of the membrane separation module 106 (between the exhaust port on the impermeable side 164 of the membrane separation module and the connected fuel tank 101).

The generation of fuel vapor is the same as in example 2-1 and a method of collecting fuel vapor adsorbed by the canister by starting the engine is as follows.

As soon as the engine is started, the blower 105, which is a gas carrying means, is started. As the blower 105 is started, a prescribed amount of flow is adsorbed through the exhaust port on the impermeable side 164 of the membrane separation module 106 and then air is adsorbed through the gas exhaust port 122 of the canister. Next, air is blown in through the gas inflow port 123. As air is blown in, fuel vapor adsorbed by the activated carbon inside the canister 102 will be purged and fuel vapor will flow into the membrane separation module 106 by way of the path 112. Further, the operation at the membrane separation module 106 and the operation of collection are the same as the examples 2-1 and 2-2.

Example 2-4

Figure 16:
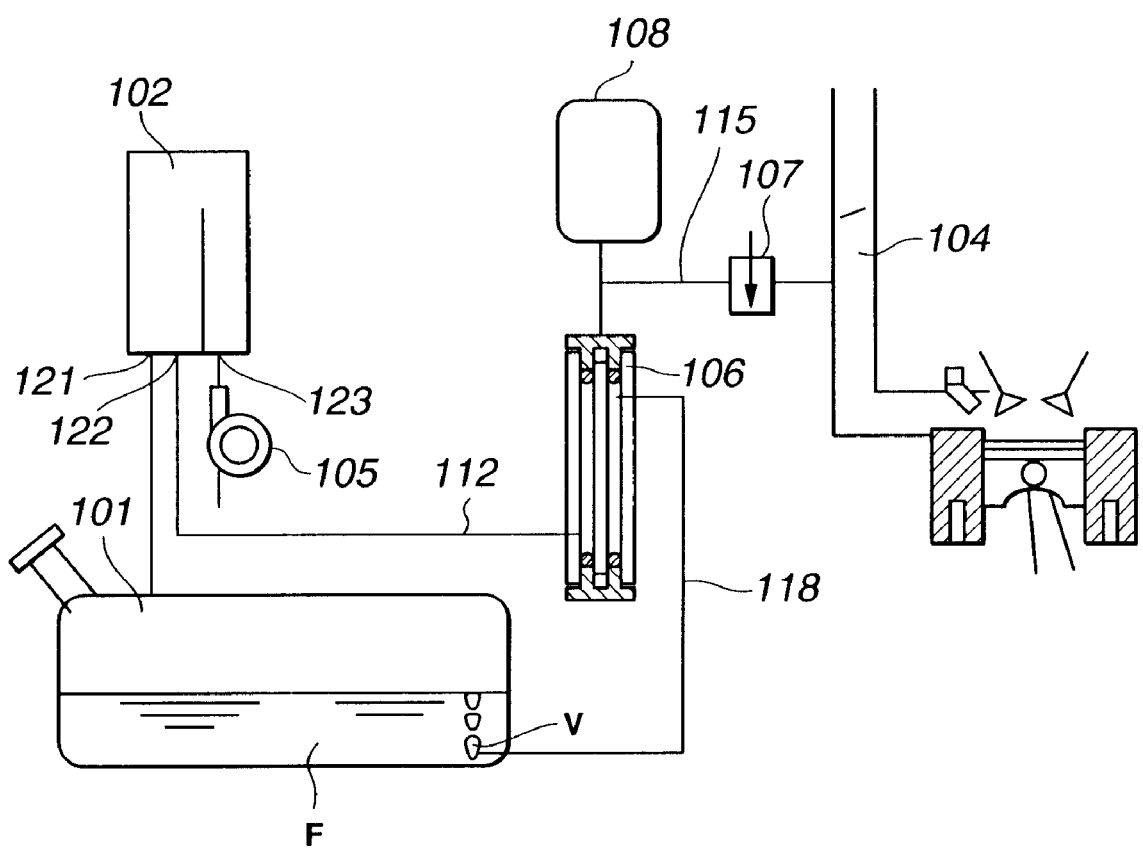
FIG. 16 is a cross-sectional view of a further example of the fuel vapor recovery system of the present invention.

FIG. 16 shows another example of the fuel vapor recovery system of the present invention. Unlike that of example 2-1, the system of this example does not comprise a cooling module and fuel vapor is adsorbed by fuel inside the fuel tank 101 and then collected.

The generation of fuel vapor is the same as in example 2-1 and a method of collecting fuel vapor adsorbed by the canister by starting the engine is as follows.

As soon as the engine is started, the blower 105, a gas carrying means, is started. As the blower 105 is started, fuel vapor adsorbed by activated carbon inside the canister 102 will be purged and will flow into the membrane separation module 106 by way of the path 112. The same steps as in example 2-1 are taken at the membrane separation module 106.

The fuel component is directly blown into the fuel tank 101 by way of the path 118 from the exhaust port on the impermeable side 164 and will be absorbed into liquefied fuel in the fuel tank 101 by bubbling and collected. Since the membrane separation module 106 condenses fuel vapor, it is possible to have it absorbed effectively and collected. Efficiency of collection is worse without the membrane separation module 106.

Further, in the case where the concentration of purged fuel vapor is high, as in the example 2-1, negative engine pressure is deemed to be OFF and driving of the membrane separation module 106 is stopped. The entire component will be emitted through the exhaust port on the impermeable side 164 and blown into the fuel tank 101 directly. This judgment can be made by detection of the concentration through the use of a fuel vapor sensor placed upstream of the membrane separation module 106 or by prediction on the basis of empirical rules acquired by experiments using vehicles. Judgment on the treatment cycles can be made as in the example 2-1.

Example 2-5

Figure 17:
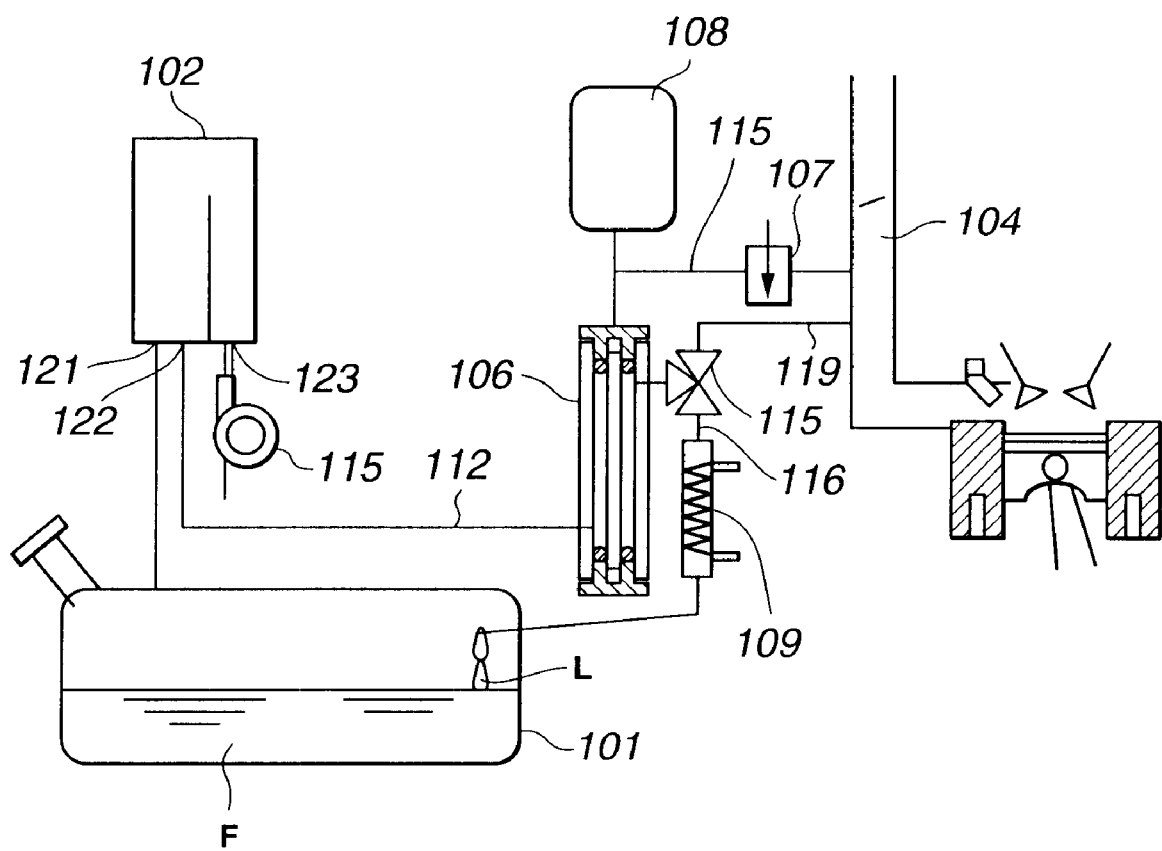
FIG. 17 is a cross-sectional view of a further example of the fuel vapor recovery system of the present invention.

This example shows a system in which a bypass is set to enable quick purging when a heavy burden is loaded on the canister 102 in the event of long term parking or a long traffic jam in summer, as shown in FIG. 17.

Basic connection of each component is the same as FIG. 11 shown in example 2-1, but in FIG. 17 it differs in that a bypass 119 is connected to the induction pipe 104 by way of a three-way valve 151 placed at the midpoint of the path 116.

When the number of engine revolutions exceeds a prescribed number (more than 2000 rpm) or when an air conditioner is on and torque is large, the three-way valve 51 is connected to the bypass and fuel vapor is supplied from the canister to the induction pipe 104 to be burned. On the other hand, when the number of engine revolutions is below 2000 rpm or when torque is small at the time of driving at a certain speed, the three-way valve 151 is connected to the cooling module 109 to have fuel vapor blown into the fuel tank.

By performing the above control, when the number of revolutions exceeds a prescribed number, which does not deteriorate the stability of the engine or the component of exhaust gas, or under the conditions where torque is needed, it is possible to promote desorption from the canister 102 by burning fuel vapor exhaustively.

Figure 21:
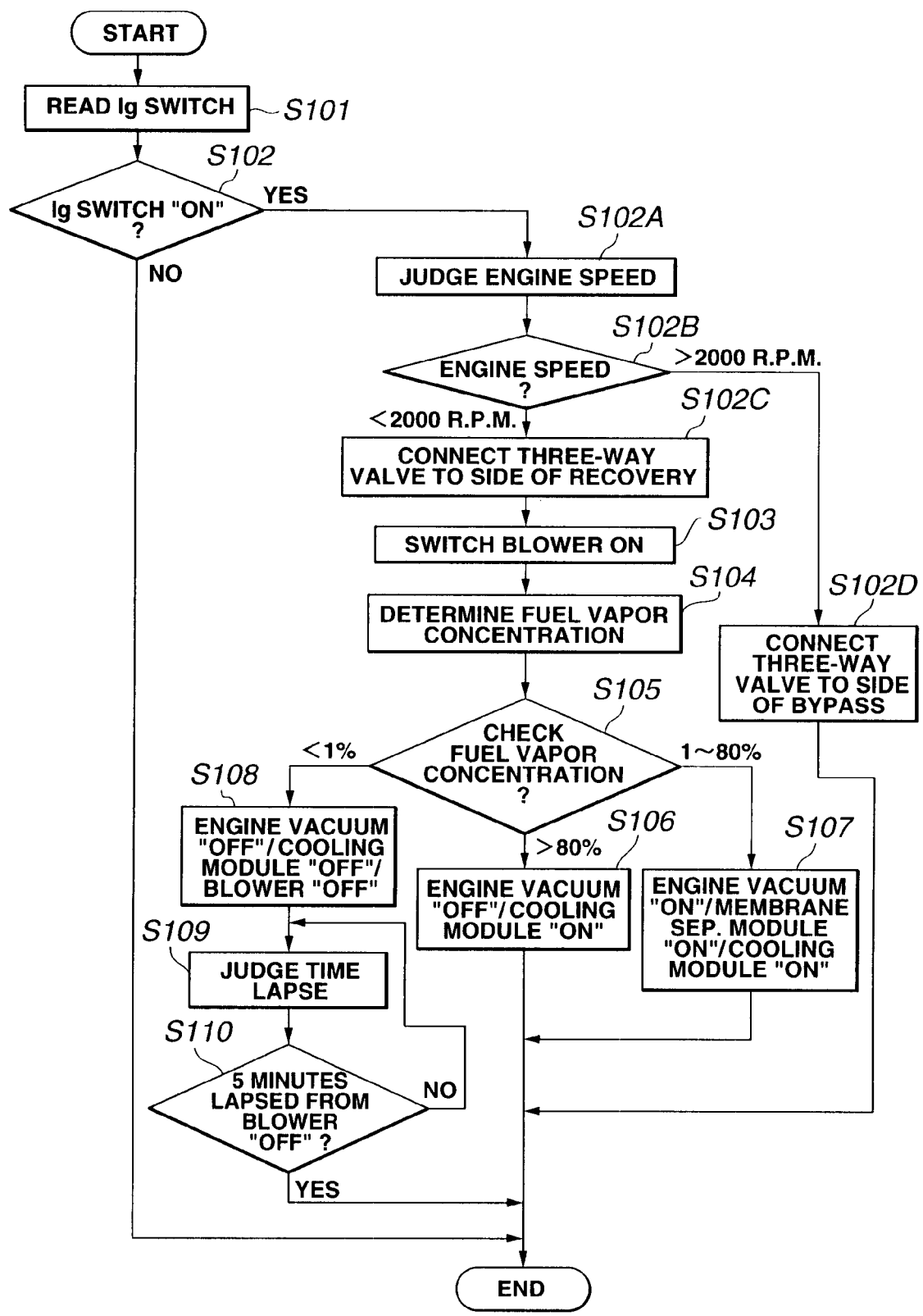
FIG. 21 is a flow chart showing a controlling example of the fuel vapor recovery system shown in FIG. 17.

The operation in the case where the bypass is added will be described based on the flow chart shown in FIG. 21 which is similar to that in FIG. 13.

In this example where fuel vapor is quickly purged in the engine, the number of engine revolutions is checked after the ignition (Ig) switch is turned on. If the number of engine revolutions (or engine speed) is below 2000 r.p.m., the three-way valve is connected to the path for collection (See steps S102A, S102B and S102C). This is followed, as in the example 2-1, by the S103 step where the blower, a gas carrying means, is turned on, and gas from the canister is blown into the collection module and the same procedures as in example 2-1 are taken.

In the case where the number of engine revolutions exceeds 2000 r.p.m., the three-way valve is connected to the bypass and fuel vapor is blown into the induction pipe to dispose of fuel vapor quickly by combustion and the routine of the flow chart ends (See step S102D).

Here the number of engine revolutions is expressed by trigger, but switching the air conditioner on or off or torque can be used as an index for judgment. The number of engine revolutions can be changed according to need. Also, judgment can be made by a combination of each trigger.

Example 2-6

Figure 18:
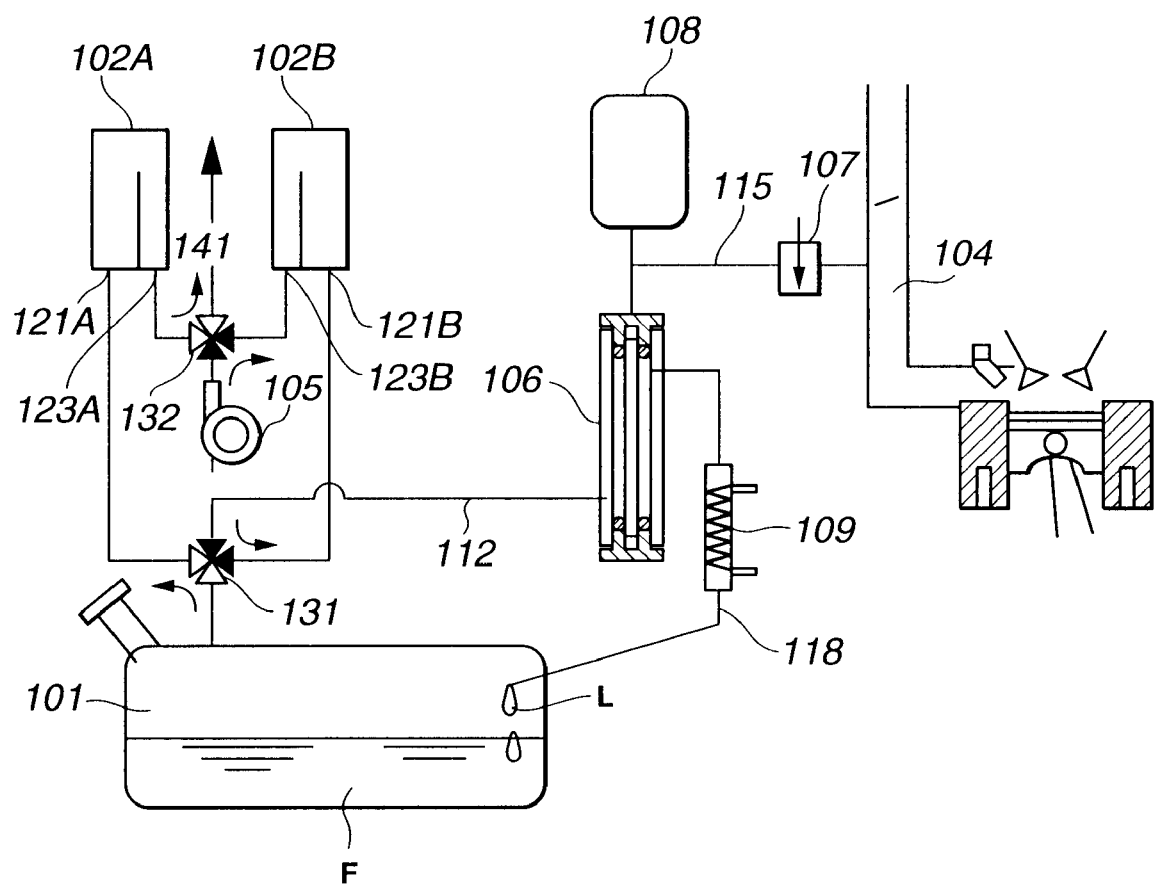
FIG. 18 is a cross-sectional view of a further example of the fuel vapor recovery system of the present invention, in a condition.
Figure 19:
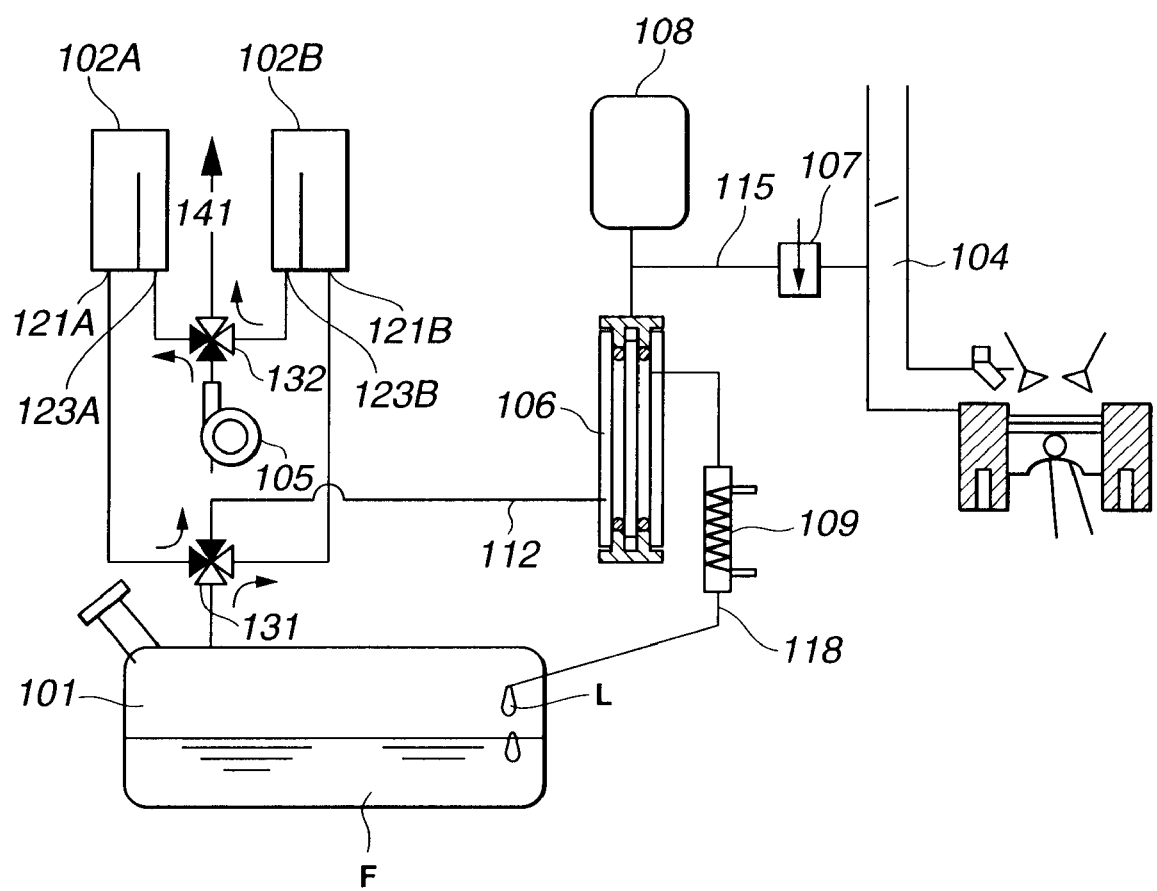
FIG. 19 is a cross-sectional view of the fuel vapor recovery system shown in FIG. 18, in another condition.

FIGS. 18 and 19 show the other example of the fuel vapor recovery system of the present invention and the system of the present invention has the same composition as example 2-1 except that it has two canisters 102A and 102B. The system of this example performs a swing operation of adsorption and desorption of fuel vapor by controlling valves and the adsorption process and the desorption process are allotted to each canister and fuel vapor is collected.

First, a description will be given to the connection of the components of the system shown in FIG. 18.

The two canisters 102A and 102B comprise inflow ports 121A and 121B respectively connected to the paths that lead fuel vapor from the fuel tank 101 to each canister, and gas inflow ports 123A and 123B that introduce gas to purge fuel vapor adsorbed by the adsorbent inside each canister.

In this example, adsorption and desorption of fuel vapor is carried out by swing operation. Cross four-way valves 131 and 132 are placed, respectively, in front of the inflow ports 121A and 121B as well as the gas inflow ports 123A and 123B, and by switching each valve, fuel vapor is either adsorbed or desorbed.

The operation of the fuel vapor recovery system comprising the above composition will be described, based on the flow chart shown in FIG. 20.

First, a description will be given as to the case where fuel vapor is generated, when the ignition switch (Ig) of the engine is turned off, more specifically, when the engine is stopped. Since in this example the two canisters are used by swing operation, a description will be given first as to the case where fuel vapor is set to go through the cross four-way valve 131 and to be adsorbed by the canister 102A, as is shown in FIG. 18.

In the case where the valve is set, as is shown in FIG. 18, fuel vapor generated in the fuel tank 101 is adsorbed by the adsorbent of the canister 102A after it goes through the inflow port 121A by way of the cross four-way valve 131. In this case, gas, causing the internal pressure of the tank goes through the gas inflow port 123A by way of the cross four-way valve 132 and takes the path 141 before being released into the atmosphere.

Figure 20:
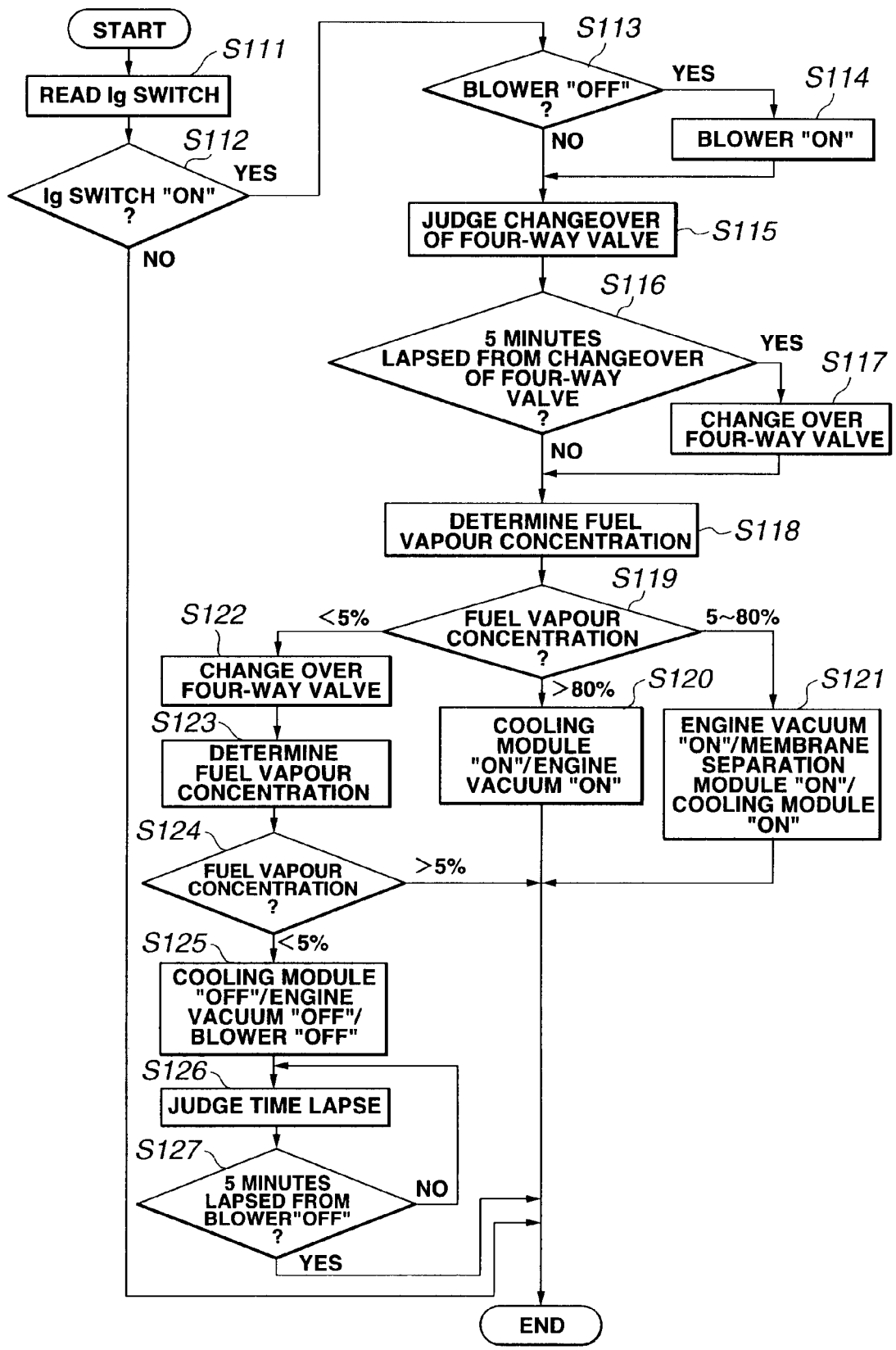
FIG. 20 is a flow chart showing a controlling example of the fuel vapor recovery system shown in FIG. 18.

Also, in this case, in the flow chart in FIG. 20, when the ignition switch (Ig) is read to learn whether the switch is on or off (See step S111), No is selected and the routine of the flow chart ends.

Next, description will be given as to a method of collecting fuel vapor adsorbed by the canister by starting the engine.

When the engine is started (the ignition switch Ig is turned on), the ignition switch is judged to be yes (See step S112). Then judgment on whether the blower is off or not is made (See step S113) and first of all, the blower 5 is started (See step S114). Following this, judgment on whether the cross four-way valves should be switched or not is made (See step S115). It is determined whether or not more than five minutes have passed since switching the valves (See step S116) and if so, the cross four-way valves are switched (See step S117). Five minutes is a swing cycle time of the engine which is started and represents that a swing of adsorption and desorption is repeated every five minutes.

The above description is given for a where fuel vapor is adsorbed by the canister 102A at the time of long term parking. Under such circumstances it is judged that more than five minutes have passed since the cross four-way valves were switched the last time and the cross four-way valves are switched.

When the cross four-way valves are switched, gas starts to flow as shown in FIG. 19. Air in the atmosphere supplied by the blower 105 goes through the cross four-way valve 132 and is blown through the gas inflow port 123A into the canister 102A in the prescribed quantity. Fuel vapor adsorbed by the adsorbent inside the canister 102A starts desorption and goes out of the inflow port 121A and is blown to the fuel vapor in flow port 162 of the membrane separation module 106 through the cross four-way valve 131.

On the one hand, fuel vapor generated from the fuel tank while the engine is started goes through the cross four-way valve 131 and the inflow port 121B and is adsorbed by the adsorbent inside the canister 102B. The internal pressure of the tank rises due to the generation of vapor, and makes the gas flow backward through the gas inflow port 123B. It is released into the atmosphere after going out of the cross four-way valve 132 through the path 141.

Next the concentration of the gas containing purged fuel vapor is determined (See step S118). The concentration can be clarified by a fuel vapor sensor placed upstream of the membrane separation module 106 or prediction based on empirical rules obtained by experiments using vehicles.

If the concentration of fuel vapor exceeds 80% in a step S119, the negative engine pressure is determined to be off and the entire component is blown to the cooling module 109 through the exhaust port on the impermeable side 164 of the membrane separation module and then liquefying collection is started (See step S120). The routine of the flow chart ends.

Separation by the membrane separation module is not carried out when the concentration exceeds 80% because cooling alone can liquefy and collect the vapor when the concentration exceeds 80%. It is also because the amount of air passing through the membrane decreases and the burden of the membrane separation module is heavy when the concentration exceeds 80%.

On the other hand, if the concentration of fuel vapor falls within the range of 5 to 80%, the negative engine pressure is considered to be ON and the membrane separation module 106 is started. The cooling module 109 is also turned on (See step S121). This starts separation at the membrane separation module 106 and the condensed fuel component is blown to the cooling module 109 through the exhaust port on the impermeable side 164 to be liquefied. The liquefied fuel vapor goes back to the fuel tank 101 and is collected. The routine of the flow chart ends.

While the above routine is repeated, the concentration of fuel vapor might sometimes be below 5% under some environmental or driving conditions, but in these cases, it is judged that the necessity of purging has disappeared or that purging is completed and the cross four-way valves are switched (See step S122) and the concentration is again detected (See step S123).

Further, in the examples from 1 to 4, the concentration below 1% represents the completion of purging, but in this example, in which the two canisters are used and swing operation is performed, switching of the canisters is carried out every five minutes and more room is available for purging. Therefore, the reference value is set at 5% (See step S124).

When the valves are switched, gas flows as is shown in FIG. 18. Specifically fuel vapor in the canister 102B is supplied to the membrane separation module 106 while vapor in the fuel tank 101 is adsorbed by the canister 102A. If the canister 102B adsorbs fuel vapor, the concentration of fuel vapor supplied by the membrane separation module 106 rises.

If the concentration exceeds 5% under the above circumstances, the routine of the flow chart is ended and desorption of the canister 102B is started from the beginning. On the other hand, if the concentration remains below 5% after the valves are switched, it is determined that the quantity of fuel vapor adsorbed by the canisters 102A and 102B is not sufficient, and each of the cooling module, negative pressure of the engine, and the blower is considered to be off (See step S125). Collection of fuel vapor is stopped. Collection is stopped to save unnecessary energy consumption and avoid the deterioration in achievable mileage. After five minutes pass (See step S126, S127), the routine of the flow chart is ended.

If the engine is started, the repetition of the above cycles illustrated in the flow chart will gradually purge fuel vapor stored in the canisters and it becomes possible to deal with fueling or long term parking.

In addition, in this example, the concentration is checked every five minutes at the longest. Therefore, although there is a fluctuation in the amount of generated fuel vapor due to changes in the driving conditions or the environment, it is possible to select a collecting method appropriate for the circumstances immediately and to collect fuel vapor.

After the vapor is blown into the membrane separation module the same procedures as the examples 2-1 to 2-4 are taken.

Since adsorption and desorption can be performed by the separate canisters in this example, the desorption process is not affected unlike those of examples 2-1 to 2-4 though a great deal of fuel vapor is generated in the tank of the running engine at the time of a traffic jam in summer. Moreover, since fuel vapor of a high concentration is not supplied to the membrane separation module, the system lessens the burden on the membrane separation module.

In addition, in the case where evaporative emission control is tightened or where the capacity of the canisters falls short due to long term parking, switching of the cross four-way valves at certain intervals can make the vapor be adsorbed equally by the two canisters.

In this case, it is possible to calculate the capacity of the two canisters 102A and 102B as adsorption capacity of fuel vapor generated when the engine is stopped. However, it is not preferable to switch the valves too frequently since switching consumes the battery.

In this example, the blower 105 is placed on the cross four-way valve 132, but the valve can be placed either upstream of the supplying side or downstream of the impermeable side of the membrane separation module, as is shown in the examples 2-2 and 2-3.

Example 2-7

Figure 22:
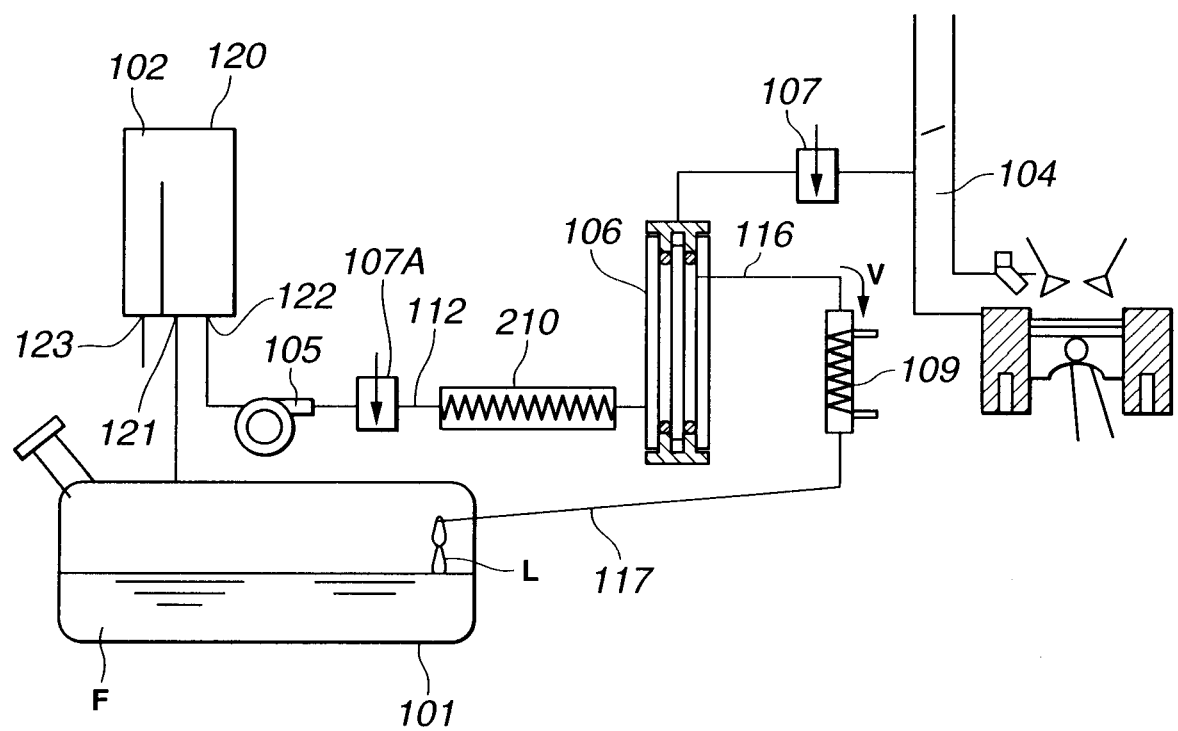
FIG. 22 is a cross-sectional view of a further example of the fuel vapor recovery system of the present invention.

FIG. 22 illustrates a further example of the fuel vapor recovery system of the present invention, similar to Example 2-1 shown in FIG. 14 with the following exceptions: The blower 105 serving as the gas transporting or supplying device is disposed in the path 112 upstream of the control valve 107A. More specifically, the blower 105 is located between the exhaust port 112 of the canister 102 and the fuel vapor inflow port 162 of the membrane separation module 106. A column-like adsorption buffer 210 is disposed in the path 112 upstream of the membrane separation module 106, more specifically immediately upstream of the fuel vapor inflow port 162 of the membrane separation module 106. The adsorption buffer 210 contains a gas adsorbing material such as activated carbon. A control valve 107 is disposed in the path 112 between the blower 105 and the adsorption buffer 210. Additionally, the negative pressure chamber 108 in Example 2-1 is omitted.

Effects of the adsorption buffer 210 has been confirmed by experiments, as discussed with reference to FIG. 23.

In the experiments, dependency of purged gas (fuel vapor purged from the canister) on the concentration of the purged gas ("purged gas concentration") and the time lapsed for purging operation for the canister (or "purging lapse time") was measured, using the system shown in FIG. 22. More specifically, measurements were made to determine how the concentration of fuel vapor to be supplied to the membrane separation module 106 changes according to presence or absence of the adsorption buffer 210 and according to the size of the adsorption buffer. The measurements were made from the starting of the purging operation for the canister 102 after butane gas had been filled in activated carbon in the canister 102 to obtain a saturated condition of the activated carbon with butane gas. The result of the measurements is shown in the graph of FIG. 23.

Figure 23:
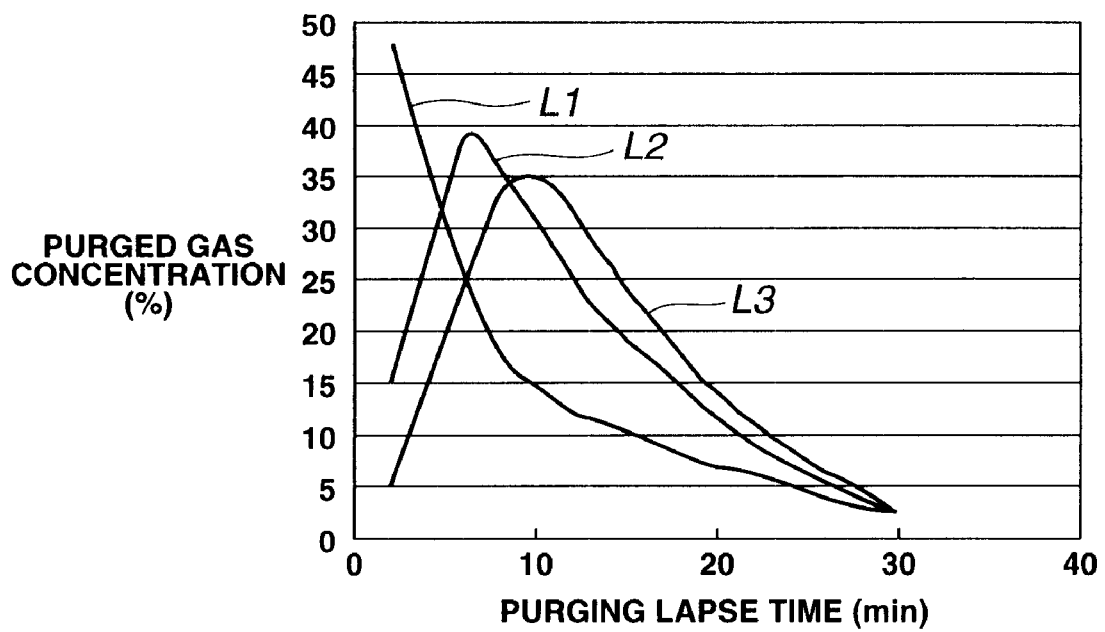
FIG. 23 is a graph showing the relationship between the purged gas concentration (%) and the purging lapse time (min.) in an adsorption buffer used in the fuel vapor recovery system of FIG. 22.

As depicted in FIG. 23, in case that no adsorption buffer (210) is provided (as indicated by a line L1), fuel vapor was purged at a high concentration immediately after starting of purging operation of fuel vapor from the canister 102 during the purging operation of the canister under operation of the blower 105; and then, the concentration of the purged gas lowered with lapse of time. The concentration of the purged fuel vapor reached 80% at a time (about 3 minutes after) immediately after the starting of the purging operation, though not shown.

In case that the adsorption buffer 210 of the type having a volume of 0.5 liter was provided (as indicated by a line L2), the concentration of the purged fuel vapor gradually rose and reached the maximum level at a time of 5 minutes after the purging operation starting; and then, it gradually lowered. In case that the adsorption buffer 210 of the type having a volume of 1.0 liter (as indicated by a line L3), the concentration reaches the maximum level at a time of 10 minutes after the purging operation starting.

As apparent from the above, by providing the adsorption buffer 210, the high concentration of the purged fuel vapor established at the time immediately after the purging operation starting can be lowered to a low level, and therefore the fuel vapor can be gradually released to the membrane separation module. This decreases load of membrane separation operation of the membrane separation module, avoids complicated control, and makes unnecessary a sensor or the like for judging the concentration of the purged fuel vapor. Furthermore, by gradually releasing the fuel vapor, a time for functioning the cooling module 109 can be sufficiently obtained. A liquefaction recovery efficiency of the fuel vapor can be improved by taking a relatively long cooling time of the cooling module 109, or by gradually releasing the fuel vapor so as to retard the time at which the concentration of the purged fuel vapor reaches the maximum level.

The adsorption buffer 210 includes a column member (not identified) filled with the gas adsorbing material. The adsorbing material is preferably activated carbon, as described above, because activated carbon is relatively low in cost, large in surface area per unit volume, the maximum in adsorbing amount of fuel vapor per unit weight. It will be understood that the adsorbing material may be zeolite or porous resin.

The adsorption buffer 210 has a fuel vapor adsorption capacity (or the maximum volume of the fuel vapor which can be contained in the adsorbing material) ranging from 10 to 100% of that of the canister 102. If the capacity exceeds 100%, a too long time is required for purging operation for the canister. If the capacity is lower than 10%, the function of adsorption buffer cannot be accomplished.

The adsorption buffer 210 is not particularly limited in shape; however, it is preferable to ensure a relatively long staying time of gas or fuel vapor in the adsorbing material in the adsorption buffer. For this purpose, for example, the column member of the adsorption buffer 210 maybe spirally wound to ensure a required length of the adsorption buffer 210, or the adsorbing material may be the filled in the shape of a so-called checkered honeycomb.

Further, one or plural adsorption buffers 210 may be disposed in the path 112 and located upstream or downstream of the blower (gas transporting or supplying device) 105, in which the locational relationship between the adsorption buffer and the gas transporting device is not particularly limited, exhibiting effects of the adsorption buffer.

Furthermore, it is preferable that the fuel vapor recovery system is provided with a device or means for preventing fuel vapor (generated in the fuel tank) from being supplied to the adsorbing buffer during stopping of the engine. If fuel vapor is supplied to the adsorption buffer during stopping of the engine, fuel vapor is adsorbed by the adsorbing material in the adsorption buffer, and therefore the adsorption buffer cannot function as a buffer. In other words, when the engine is re-started, fuel vapor is unavoidably released from the adsorption buffer within a short time. An example of this fuel vapor preventing device is a control valve 107A disposed upstream and near the gas inlet of the adsorption buffer 210, in which the control valve 107A is closed to prevent fuel vapor from the canister 102 from being adsorbed by the adsorbing material in the adsorption buffer 210.

A detailed description was given as to the present invention, referring to several preferred examples above, but the present invention is not limited to these examples and various variations are possible within the range of the summary of the present invention.

As is described above, the present invention illustrated by FIGS. 11 to 23 is arranged to separate air containing fuel vapor generated by the fuel tank or the canister during purging by the use of the membrane separation module, having air selective permeability, and negative pressure is used as a driving force of the membrane separation. Therefore, the invention can provide a fuel vapor recovery system, which does not require installation of a vacuum pump and does not affect the driving characteristics or the component of exhaust gas although the component that permeates the membrane separation module is sent to the induction pipe of the engine, and which does not release fuel vapor into the atmosphere although a good deal of fuel vapor is generated.

Specifically, the fuel vapor recovery system of the present invention can collect fuel vapor effectively since the membrane separation module condenses fuel vapor contained in the purge gas out of the fuel tank or canister. Also, since negative engine pressure is used as a driving force of the membrane separation, the system has a benefit in that it does not require new installation of a vacuum pump, which is heavy in weight and expensive in terms of its cost and the expenses of power consumption. In addition, for the membrane separation module a separation membrane having air selective permeability is used, and the system has benefits in that it can send the air-rich component to the induction pipe of the engine and does not affect the driving performance and exhaust performance of the engine although negative engine pressure is used as the driving force of the membrane separation.

The entire contents of Japanese Patent Applications P2000-032500 (filed Feb. 9, 2000), P2000-032501 (filed Feb. 9, 2000), P2000-318957 (filed Oct. 19, 2000), P2000-363626 (filed Nov. 29, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A fuel vapor treatment system comprising:
    a canister containing a fuel vapor adsorbing material and having a portion defining an inflow port through which fuel vapor from a fuel tank for an engine is flown to the fuel vapor adsorbing material, a portion defining a gas introduction port though which a purge gas for purging fuel vapor adsorbed in the fuel vapor adsorbing material is introduced into said canister, and a portion defining an outflow port through which fuel vapor purged from the fuel vapor adsorbing material is flown out of said canister;
    a fuel vapor treating device for treating fuel vapor flown out of said canister through the outflow port so as to form a gas whose major part is other than fuel vapor;
    a gas supplying device connected to said canister, for supplying the purge gas into the canister to purge fuel vapor from the fuel vapor adsorbing material and causing the purged fuel vapor to be fed to said fuel vapor treating device,
    wherein the gas formed in said fuel vapor treating device is introduced into at least one of an intake air passageway and an exhaust gas passageway of the engine so as to be combusted in the engine.

2. A fuel vapor treatment system as claimed in claim 1, wherein
    said fuel vapor treating device imcludes a member seraration module connected to said canister and including a separation membrane for separating a mixture gas into an air-rich component and a fuel vapor-rich component, said separation membrane having an air-selective permeability so that the air-rich component is able to pass through the separation membrane, said mixture gas containing air and fuel vapor, said membrane separation module having a portion defining a fuel vapor-rich component discharge port through which the fuel vapor-rich component is discharged out of said membrane separation module; and said gas supplying device includes a gas transporting device connected to said canister, for causing the purge gas to be introduced into the canister to purge fuel vapor from the fuel vapor absorbing material and causing the purged fuel vapor to be fed to said membrane separation module, wherein the air-rich component discharge port of said membrane separation module is connected to an intake air passageway of an engine so that vacuum generated by the engine acts on said separation membrane so as to serve as a driving force for membrane separation, and wherein the fuel vapor-rich component discharge port of said membrane separation module is connected to the fuel tank so that the fuel vapor component contained in the fuel vapor-rich component is recovered to the fuel tank upon being subjected to at least one of liquefaction and absorption to liquid in the fuel tank.

3. A fuel vapor treatment system as claimed in claim 2, wherein said membrane separation module has a portion defining a fuel vapor introduction port through which fuel vapor from the outflow port of said canister is introduced into said membrane separation module, wherein said gas transporting device is disposed between the outflow port of said canister and the fuel vapor introduction port of said membrane separation module.

4. A fuel vapor treatment system as claimed in claim 2, further comprising a control valve disposed between the air-rich component discharge port of said membrane separation module and the intake air passageway of the engine, said control valve being arranged to be opened in accordance with vacuum prevailing in the intake air passageway.

5. A fuel vapor treatment system as claimed in claim 2, wherein said gas transporting device is variable in gas transporting capacity and arranged to control a flow amount ratio between the air-rich component and the fuel vapor-rich component in said membrane separation module, within a range of from 0:10 to 5:5.

6. A fuel vapor treatment system as claimed in claim 2, further comprising at least one of a first flow control valve disposed upstream of the fuel vapor introduction port of said membrane separation module and a second flow control valve disposed downstream of the fuel vapor-rich component discharge port of said membrane separation module, the at least one of said first and second flow control valves being arranged to control a flow amount ratio between the air-rich component and the fuel vapor-rich component in said membrane separation module, within a range of from 0:10 to 5:5.

7. A fuel vapor treatment system as claimed in claim 2, further comprising at least one of a first flow control valve disposed upstream of the fuel vapor introduction port of said membrane separation module and a second flow control valve disposed downstream of the fuel vapor-rich component discharge port of said membrane separation module, the at least one of said first and second flow control valves and said gas transporting device being incorporative to control a flow amount ratio between the air-rich component and the fuel vapor-rich component in said membrane separation module, within a range of from 0:10 to 5:5.

8. A fuel vapor treatment system as claimed in claim 2, further comprising a device for carrying out liquefaction of the fuel vapor-rich component by absorption of the fuel vapor-rich component into liquid fuel in the fuel tank.

9. A fuel vapor treatment system as claimed in claim 2, further comprising a cooling module disposed between the fuel vapor-rich component discharge port of said membrane separation module and the fuel tank so as to liquefy fuel vapor to be recovered to the fuel tank.

10. A fuel vapor treatment system as claimed in claim 2, further comprising a device for accomplishing a control in which driving of said membrane separation module is stopped to flow a whole amount of fuel vapor supplied to said membrane separation module through the fuel vapor-rich component discharge port when concentration of fuel vapor to be supplied to said membrane separation module exceeds a level, so that fuel vapor is liquefied and recovered.

11. A fuel vapor treatment system as claimed in claim 2, wherein the separation membrane includes a first separation membrane formed of at least one material selected from the group consisting of silica, alumina, zeolite, ZSM, and aluminophosphate-based molecular sieve.

12. A fuel vapor treatment system as claimed in claim 11, wherein the separation membrane includes a second membrane which is at least one membrane selected from the group consisting of a silicon membrane, a carbonized membrane of pyrolytic polymeric plastic, a mordenite membrane and a ferrierite membrane.

13. A fuel vapor treatment system as claimed in claim 12, wherein the-separation membrane includes the first and second membranes to form a hybrid membrane.

14. A fuel vapor treatment system as claimed in claim 2, wherein said membrane separation module further includes a tubular porous substrate on which said separation membrane is formed.

15. A fuel vapor treatment system as claimed in claim 2, further comprising an adsorption buffer disposed between said canister and said membrane separation module and containing a gas adsorbing material, said adsorption buffer having an ability to temporarily adsorb fuel vapor and arranged to decrease a concentration of fuel vapor in a gas purged from said canister to said membrane separation module at a time immediately after starting of discharge of the purged gas from said canister, to decrease variation in the concentration of fuel vapor in the purged gas and to gradually supply the purged gas from said canister to said membrane separation module.

16. A fuel vapor treatment system as claimed in claim 15, wherein said gas adsorbing material is activated carbon.

17. A fuel vapor treatment system as claimed in claim 15, wherein said adsorption buffer is disposed upstream of said gas transporting device.

18. A fuel vapor treatment system as claimed in claim 15, wherein said adsorption buffer is disposed downstream of said gas transporting device.

19. A fuel vapor treatment system as claimed in claim 15, wherein said adsorption buffer has a fuel vapor adsorption capacity ranging from 10 to 100% of that of said canister.

20. A fuel vapor treatment system as claimed in claim 15, further comprising a device for preventing fuel vapor from being supplied to said adsorption buffer during stopping of the engine, disposed upstream of said adsorption buffer.

21. A fuel vapor treatment system as claimed in claim 20, wherein said preventing device is a valve disposed close to a gas inlet of said adsorption buffer.

22. A fuel vapor treatment system as claimed in claim 2, wherein said gas transporting device is disposed upstream of the gas introduction port of said canister.

23. A fuel vapor treatment system as claimed in claim 2, wherein said gas transporting device is disposed downstream of the fuel vapor-rich component discharge port of said membrane separation module.

24. A fuel vapor treatment system as claimed in claim 4, further comprising a device defining a chamber located between said control valve and the air-rich component discharge port of said membrane separation module.

25. A fuel vapor treatment system as claimed in claim 2, further comprising an additional canister containing a fuel vapor adsorbing material and having a portion defining an inflow port through which fuel vapor from the fuel tank for the engine is flown to the fuel vapor adsorbing material, a portion defining a gas introduction port though which the purge gas for purging fuel vapor adsorbed in the fuel vapor adsorbing material is introduced into said canister, and a portion defining an outflow port through which fuel vapor purged from the fuel vapor adsorbing material is flown out of said canister; and a valve for controllably changing over operation of said canister and said additional canister so as to accomplish alternate operation between said canister and said additional canister.

26. A fuel vapor treatment system comprising:

a canister containing a fuel vapor adsorbing material and having a portion defining an inflow port through which fuel vapor from a fuel tank for an engine is flown to the fuel vapor adsorbing material, a portion defining a gas introduction port though which a purge gas containing steam is introduced into said canister so as to purge fuel vapor adsorbed in the fuel vapor adsorbing material, and a portion defining an outflow port through which fuel vapor purged from the fuel vapor adsorbing material and steam are flown out of said canister;

a gas supplying device for supplying the purge gas into said canister; and a reforming device for carrying out steam reforming for fuel vapor discharged through the outflow port of said canister to form reformed gas containing hydrogen and carbon monoxide, wherein the reformed gas is introduced into an intake air passageway of the engine so as to be combusted in the engine.

27. A fuel vapor treatment system as claimed in claim 26, wherein said gas supplying device includes a device defining an exhaust gas passageway through which exhaust gas of the engine flows, wherein the purge gas is exhaust gas containing steam.

28. A fuel vapor treatment system comprising:

a canister containing a fuel vapor adsorbing material and including a hydrogen-enriching device for reforming fuel vapor adsorbed in the fuel vapor adsorbing material so as to form a hydrogen-rich gas, said canister having a portion defining an inflow port through which fuel vapor from a fuel tank of an engine is flown to the fuel vapor adsorbing material, a portion defining a gas introduction port though which a purge gas is introduced into said canister so as to purge fuel vapor the hydrogen-rich gas in said canister, and a portion defining an outflow port through which the purged hydrogen-rich gas is flown out of said canister; and a gas transporting device for supplying the purge gas into said canister, wherein the purged hydrogen-rich gas is introduced into an exhaust gas passageway of the engine so as to purify exhaust gas of the engine.

29. A fuel vapor treatment system as claimed in claim 28, wherein the fuel vapor adsorbing material includes an inorganic porous substance containing at least one of silicon oxide and aluminium oxide, wherein the hydrogen-enriching device includes a reforming catalyst containing rhodium, and a heating mechanism for heating the reforming catalyst.

30. A fuel vapor treatment system as claimed in claim 29, wherein the heating mechanism includes a heat exchanger using heat of exhaust gas of the engine.

31. A fuel vapor treatment system as claimed in claim 30, wherein the heating mechanism is arranged to control temperature of the reforming catalyst within a range of from 260 to 380° C.

32. A fuel vapor treatment system as claimed in claim 28, further comprising a device for storing the hydrogen-rich gas before introduction to the exhaust gas passageway.

33. A fuel vapor treatment system as claimed in claim 28, further comprising a device for causing the fuel vapor adsorbing material and the hydrogen-enriching device to generally simultaneously function.

34. An exhaust gas purification system for an internal combustion engine, comprising:

a catalyst for purifying exhaust gas of the internal combustion engine; and a fuel vapor treatment system including a canister containing a fuel vapor adsorbing material and having a portion defining an inflow port through which fuel vapor from a fuel tank for the engine is flown to the fuel vapor adsorbing material, a portion defining a gas introduction port though which a purge gas containing steam is introduced into said canister so as to purge fuel vapor adsorbed in the fuel vapor adsorbing material, and a portion defining an outflow port through which fuel vapor purged from the fuel vapor adsorbing material and steam are flown out of said canister, a gas supplying device for supplying the purge gas into said canister, and a reforming device for carrying out steam reforming for fuel vapor discharged through the outflow port of said canister to form reformed gas containing hydrogen and carbon monoxide, wherein the reformed gas is introduced to said exhaust gas purifying catalyst to reduce nitrogen oxides in exhaust gas of the engine.

35. An exhaust gas purification system for an internal combustion engine, comprising:

a catalyst for reducing NOx in exhaust gas of the internal combustion engine; and a fuel vapor treatment system including a canister containing a fuel vapor adsorbing material and including a hydrogen-enriching device for reforming fuel vapor adsorbed in the fuel vapor adsorbing material so as to form a hydrogen-rich gas, said canister having a portion defining an inflow port through which fuel vapor from a fuel tank of the engine is flown to the fuel vapor adsorbing material, a portion defining a gas introduction port though which a purge gas is introduced into said canister so as to purge fuel vapors the hydrogen-rich gas in said canister, and a portion defining an outflow port through which the purged hydrogen-rich gas is flown out of said canister, and a gas transporting device for supplying the purge gas into said canister, wherein the purged hydrogen-rich gas from the hydrogen-enriching device is supplied to the NOx reducing catalyst so as to reduce nitrogen oxides and removing sulfur compound in exhaust gas of the engine.

36. An exhaust gas purifying system as claimed in claim 35, further comprising a device for carrying out supply of the hydrogen-rich gas to the NOx reducing catalyst in timed relation to timing of variation in oxygen concentration in exhaust gas.

37. An exhaust gas purifying system as claimed in claim 35, further comprising a device for carrying out supply of the hydrogen-rich gas to the NOx reducing catalyst when temperature of exhaust gas is not higher than 250° C.

38. An exhaust gas purifying system as claimed in claim 37, wherein said hydrogen-enriching device includes a catalyst for a reforming catalyst containing rhodium, wherein said exhaust gas purifying system further comprises a device for controlling temperature of the reforming catalyst within a range of from 350 to 380° C.

39. An exhaust gas purification system as claimed in claim 35, further comprising a device for supplying the hydrogen-rich gas to the NOx reducing catalyst when temperature of exhaust gas flowing through the exhaust gas passageway is not lower than 500° C.

40. An exhaust gas purification system as claimed in claim 35, further comprising a device for controlling temperature of the reforming catalyst within a range of from 350 to 500° C.

41. A fuel vapor treatment system comprising:

a canister containing a fuel vapor adsorbing material and having a portion defining an inflow port through which fuel vapor from a fuel tank for an engine is flown to the fuel vapor adsorbing material, a portion defining a gas introduction port though which a purge gas for purging fuel vapor adsorbed in the fuel vapor adsorbing material is introduced into said canister, and a portion defining an outflow port through which fuel vapor purged from the fuel vapor adsorbing material is flown out of said canister;

means for treating fuel vapor flown out of said canister through the outflow port so as to form a gas whose major part is other than fuel vapor;

means for supplying the purge gas into the canister to purge fuel vapor from the fuel vapor adsorbing material and causing the purged fuel vapor to be fed to said fuel vapor treating means, wherein the gas formed in said fuel vapor treating means is introduced into at least one of an intake air passageway and an exhaust gas passageway of the engine so as to be combusted in the engine.

42. A fuel vapor treatment system comprising:

a canister containing a fuel vapor adsorbing material and having a portion defining an inflow port through which fuel vapor from a fuel tank for an engine is flown to the fuel vapor adsorbing material, a portion defining a gas introduction port though which a purge gas containing steam is introduced into said canister so as to purge fuel vapor adsorbed in the fuel vapor adsorbing material, and a portion defining an outflow port through which fuel vapor purged from the fuel vapor adsorbing material and steam are flown out of said canister;

means for supplying the purge gas into said canister; and reforming means for carrying out steam reforming for fuel vapor discharged through the outflow port of said canister to form reformed gas containing hydrogen and carbon monoxide, wherein the reformed gas is introduced into an intake air passageway of the engine so as to be combusted in the engine.

* * * * *